(12) United States Patent
Tomita et al.

(10) Patent No.: US 6,732,372 B2
(45) Date of Patent: May 4, 2004

(54) TRANSMISSION DEVICE AND TERMINAL DEVICE FOR AUTOMATIC RECEPTION/RECORDING OF BROADCAST PROGRAMS

(75) Inventors: Yasumasa Tomita, Kawasaki (JP); Shigeru Oizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 08/838,922

(22) Filed: Apr. 11, 1997

(65) Prior Publication Data

US 2001/0013127 A1 Aug. 9, 2001

(30) Foreign Application Priority Data

May 27, 1996 (JP) .............................................. 8-131726

(51) Int. Cl.$^7$ .......................... H04N 5/445; H04N 7/14; G06F 3/00; G06F 13/00
(52) U.S. Cl. ............................. 725/47; 725/44; 725/58; 725/51; 725/86; 348/563; 348/569; 348/906
(58) Field of Search ............................. 348/12, 113, 7, 348/565; 345/327, 354; 455/4.2; 725/37–61, 86–87; 386/83; H04N 7/173

(56) References Cited

U.S. PATENT DOCUMENTS

| | | | | |
|---|---|---|---|---|
| 4,567,512 A | * | 1/1986 | Abraham | 348/7 |
| 4,706,121 A | | 11/1987 | Young | 358/142 |
| 4,914,517 A | * | 4/1990 | Duffield | 725/57 |
| 5,014,125 A | * | 5/1991 | Pocock et al. | 348/7 |
| 5,151,789 A | | 9/1992 | Young | 358/194.1 |
| 5,353,121 A | | 10/1994 | Young et al. | 348/563 |
| 5,465,385 A | * | 11/1995 | Ohga et al. | 455/6.1 |
| 5,479,266 A | | 12/1995 | Young et al. | 358/335 |

(List continued on next page.)

FOREIGN PATENT DOCUMENTS

| | | | | |
|---|---|---|---|---|
| JP | 5-022672 | 1/1993 | | |
| JP | 5-022673 | 1/1993 | | |
| JP | 5-083688 | 4/1993 | | |
| JP | 5-284478 | 10/1993 | | |
| JP | 5-284480 | 10/1993 | | |
| JP | 5-284481 | 10/1993 | | |
| JP | 6-030411 | 2/1994 | | |
| JP | 7-147657 | 6/1995 | | |
| JP | 7-193762 | 7/1995 | | |
| JP | 8-036605 | 2/1996 | | |
| WO | 97/12486 | * | 4/1997 | ............ H04N/7/16 |
| WO | 97/33434 | * | 9/1997 | ............ H04N/7/00 |

OTHER PUBLICATIONS (Booth; Online TV Guide; Popular Science; p. 46), May 1997.*

U.S. patent application Ser. No. 08/755,763, Okawa et al., filed Nov. 21, 1996.

U.S. patent application Ser. No. 08/827,717, Tomita et al., filed Apr. 8, 1997.

U.S. patent application Ser. No. 08/840,155, Tomita et al., filed Apr. 11, 1997.

*Primary Examiner*—Andrew Faile
*Assistant Examiner*—Reuben M. Brown
(74) *Attorney, Agent, or Firm*—Staas & Halsey LLP

(57) ABSTRACT

A device for sending broadcast-program information to a plurality of terminal devices connected via a network so that the plurality of terminal devices display the broadcast-program information on display screens. The device includes an addition unit attaching at least one of a reception setting button and a recording setting button to broadcast-program information which is to be sent to a terminal device, the reception setting button and the recording setting button being used in the terminal device for issuing a request to make settings for automatic receiving and recording, respectively, of a selected broadcast program. The device further includes an execution-information extracting unit obtaining execution information in response to the request, the execution information specifying information necessary for making the settings, and a transmission unit sending the execution information to the terminal device.

34 Claims, 22 Drawing Sheets

U.S. PATENT DOCUMENTS

| | | | |
|---|---|---|---|
| 5,479,268 A | 12/1995 | Young et al. | 358/335 |
| 5,491,760 A | 2/1996 | Withgott et al. | |
| 5,532,754 A | 7/1996 | Young et al. | 348/569 |
| 5,585,838 A * | 12/1996 | Lawler et al. | 348/12 |
| 5,589,892 A * | 12/1996 | Knee et al. | 348/731 |
| 5,592,551 A * | 1/1997 | Lett et al. | 348/12 |
| 5,619,249 A * | 4/1997 | Billock et al. | 348/12 |
| 5,623,613 A * | 4/1997 | Rowe et al. | 395/353 |
| 5,657,072 A * | 8/1997 | Aristides et al. | 348/13 |
| 5,671,411 A * | 9/1997 | Watts et al. | 395/615 |
| 5,686,954 A * | 11/1997 | Yoshinobu et al. | 348/13 |
| 5,699,107 A | 12/1997 | Lawler et al. | |
| 5,701,451 A | 12/1997 | Rogers et al. | |
| 5,721,827 A | 2/1998 | Logan et al. | |
| 5,732,216 A | 3/1998 | Logan et al. | |
| 5,748,493 A * | 5/1998 | Lightfoot et al. | 348/6 |
| 5,751,282 A * | 5/1998 | Girard et al. | 345/327 |
| 5,761,606 A * | 6/1998 | Wolzien | 455/6.2 |
| 5,764,281 A * | 6/1998 | Seo | 348/553 |
| 5,774,664 A | 6/1998 | Hidary et al. | |
| 5,778,181 A * | 7/1998 | Hidary et al. | 395/200.48 |
| 5,790,172 A * | 8/1998 | Imanaka | 348/7 |
| 5,797,001 A | 8/1998 | Augenbraun et al. | |
| 5,818,438 A * | 10/1998 | Howe et al. | 345/327 |
| 5,822,539 A | 10/1998 | van Hoff | |
| 5,828,403 A * | 10/1998 | DeRodeff et al. | 348/7 |
| 5,835,843 A * | 11/1998 | Haddad | 455/4.2 |
| 5,844,633 A * | 12/1998 | Kim | 725/56 |
| 5,880,768 A * | 3/1999 | Lemmons et al. | 348/1 |
| 5,914,712 A * | 6/1999 | Sartain et al. | 345/327 |
| 5,945,987 A * | 8/1999 | Dunn | 345/327 |
| 5,973,680 A * | 10/1999 | Ueda | 725/87 |
| 6,025,837 A * | 2/2000 | Matthews et al. | 345/327 |
| 6,263,501 B1 * | 7/2001 | Schein et al. | 725/39 |

* cited by examiner

FIG.6

| DATE | STARTING TIME | ENDING TIME | CHANNEL | TYPE |
|---|---|---|---|---|
| 1996.04.11 | 14:00 | 14:35 | 1 | RECORDING |
| 1996.04.13 | 8:00 | 8:30 | 6 | RECEIVING |
| 1996.04.14 | 20:00 | 22:30 | 10 | RECORDING |
| | | | | |

FIG.9

| 11(TUES) | 14:00 | | 15:00 | |
|---|---|---|---|---|
| NNK | 00 : NEWS | | 00 : NEWS·WEATHER FORECAST | |
| | 35 : HEALTH◇EXERCISE | | 10 : HISTORICAL DRAMA | |
| NNK EDUCATION | 00 : INTRODUCTION TO CLASSICAL LITERATURE | | 00 : ART OF STORYTELLING | |
| | 30 : WORLD OF SUBATOMIC PARTICLES | | 10 : ART OF POTTERY ~ (50) | |
| EAST-WEST TV | THE WIDE | | THE WIDE | |
| | | | 50 : GOOD EVENING, EVENING NEWS | |
| TBB | 00 : SUPER WIDE | | SUPER WIDE(CONTINUED) | |
| | | | 55 : CLUB 6 | |
| SOUTH-NORTH TV | 58 : THURSDAY MYSTERY DRAMA | | THURSDAY MYSTERY DRAMA (CONTINUED) | |

Header controls: MON. TUES. WEDS. THURS. FRI. SAT. SUN. / 6 8 10 12 14 16 18 20 22 0 2 4

LAST WEEK | NEXT WEEK

MOVIE | DRAMA | MUSIC | SPORTS
NEWS | VARIETY | OTHERS

FIG.10

| PROFILE MANAGEMENT | | |
|---|---|---|
| CHANNEL SETTINGS | | OTHER SETTINGS |
| 1 NNK (1 ch)<br>2 NNK EDUCATION (3 ch)<br>3 EAST-WEST TV (4 ch)<br>4 TBB (6 ch)<br>5 SOUTH-NORTH TV (8 ch)<br>6 TV ARCTIC (10 ch)<br>7 TV ANTARCTIC (12 ch) | STANDARD ~60<br>CHANGE ~61 | CUSTOMIZED CATEGORY<br>CUSTOMIZED TIME<br>START-UP SCREEN<br><br>CHANGE ~62 |
| PASSWORD SETTING CHANGE ~63 | | |

OK   CANCEL

FIG.12

CHANNEL-NUMBER SETTING

| | 1 | 2 | 3 | 4 | 5 | 6 | 7 | 8 | 9 | 10 | 11 | 12 |
|---|---|---|---|---|---|---|---|---|---|---|---|---|
| NNK | ○ | ○ | ○ | ○ | ○ | ○ | ○ | ○ | ○ | ○ | ○ | ○ |
| NNK EDUCATION | | ○ | ○ | ○ | ○ | ○ | ○ | ○ | ○ | ○ | ○ | ○ |
| EAST-WEST TV | | ○ | ○ | ○ | ○ | ○ | ○ | ○ | ○ | ○ | ○ | ○ |
| TBB | ○ | | ○ | ○ | ○ | ○ | ○ | ○ | ○ | ○ | ○ | ○ |
| SOUTH-NORTH TV | ○ | ○ | ○ | ○ | ○ | ○ | ○ | ○ | ○ | ○ | ○ | ○ |
| TV ARCTIC | ○ | ○ | ○ | ○ | ○ | ○ | ○ | ○ | ○ | ○ | ○ | ○ |
| TV ANTARCTIC | ○ | ○ | ○ | ○ | ○ | ○ | ○ | ○ | ○ | ○ | ○ | ○ |

[NEXT SETTING] [RESET] [CANCEL] [RETURN]

FIG.13

CHANNEL-ORDER SETTING
TELEVISION STATION WITH NO CHANNEL-ORDER SETTING
WILL NOT APPEAR ON LISTING

| | | | | | | | |
|---|---|---|---|---|---|---|---|
| NNK | 1ch | ○1 | ○2 | ○3 | ○4 | ○5 | ○6 | ○7 |
| NNK EDUCATION | 3ch | ○1 | ○2 | ○3 | ○4 | ○5 | ○6 | ○7 |
| EAST-WEST TV | 4ch | ○1 | ○2 | ○3 | ○4 | ○5 | ○6 | ○7 |
| TBB | 6ch | ○1 | ○2 | ○3 | ○4 | ○5 | ○6 | ○7 |
| SOUTH-NORTH TV | 8ch | ○1 | ○2 | ○3 | ○4 | ○5 | ○6 | ○7 |
| TV ARCTIC | 10ch | ○1 | ○2 | ○3 | ○4 | ○5 | ○6 | ○7 |
| TV ANTARCTIC | 12ch | ○1 | ○2 | ○3 | ○4 | ○5 | ○6 | ○7 |

RESET   CANCEL   RETURN

FIG.14

| OTHER SETTINGS | | |
|---|---|---|
| CUSTOMIZED CATEGORY | ☐ MOVIE  ☐ DRAMA  ☐ DOCUMENTARY<br>☐ MUSIC  ☐ SPORTS  ☐ VARIETY<br>☐ NEWS   ☐ EDUCATIONAL  ☐ OTHERS | |
| CUSTOMIZED TIME | ☐ : ☐ ~ ☐ : ☐ | |
| START UP SCREEN | ○ MAIN MENU  ○ LISTING OF PROGRAMS  ○ CUSTOMIZED LISTING OF PROGRAMS<br>○ SPECIAL COVERAGE | |
| [NEXT SETTING]  [RESET]  [CANCEL]  [RETURN] | | |

FIG.15

SETTING PASSWORD

USER ID  xx xxxxx xx

CURRENT PASSWORD

NEW PASSWORD

NEW PASSWORD (PLEASE ENTER IT AGAIN)

OK

CANCEL

FIG.18

| PROGRAM SEARCH | |
|---|---|
| SEARCH SPAN | ○ TODAY  ○ UP TO TOMORROW  ○ THIS WEEK<br>○ UP TO YESTERDAY  ○ LAST WEEK |
| TIME SLOT | ☐☐ : ☐☐ ~ ☐☐ : ☐☐ |
| CATEGORY | ☐ MOVIE  ☐ DRAMA  ☐ SPORTS  ☐ OTHER<br>☐ NNK  ☐ NNK EDUCATION  ☐ EAST-WEST TV  ☐ TBB<br>☐ SOUTH-NORTH TV  ☐ TV ARCTIC  ☐ TV ANTARCTIC |
| SEARCH RESULT SUMMARY | ○ DISPLAY  ○ DO NOT DISPLAY |
| SEARCH  CANCEL | |

TRANSMISSION DEVICE AND TERMINAL DEVICE FOR AUTOMATIC RECEPTION/ RECORDING OF BROADCAST PROGRAMS

BACKGROUND OF THE INVENTION

1. Field of the Invention

The present invention generally relates to a broadcast-program-listing transmission device and terminal devices connected thereto via a network or the like, wherein the broadcast-program-listing transmission device transmits listings of broadcast programs or program-guide information to the terminal devices so as to display the listings of broadcast programs or the program-guide information on display screens of the terminal devices. The present invention particularly relates to a broadcast-program-listing transmission device which allows settings to be easily made at the sites of the terminal devices for automatic receiving/ recording of broadcast programs due to go on the air at scheduled future times, and relates to a terminal device which activates a receiver and/or a recorder according to settings made by the broadcast-program-listing transmission device.

2. Description of the Related Art

In the related art, when preparing a receiver for automatic reception of a broadcast program due to go on the air at a later time, a user makes settings to the receiver such as a television set or a radio so that the receiver will be tuned to a relevant broadcasting station at an indicated future time. When preparing a recorder for automatic recording of a broadcast program due to go on the air at a later time, a user sets the recorder such as a videocassette recorder or a cassette recorder in order to activate the recorder at a requested future time.

In either case, the user has to go through manual handling of the receiver or the recorder in order to make necessary settings. No reliable technology is yet available to allow the user to make reception/recording settings through a simple operation.

In recent years, however, progress of use of networks such as the Internet has helped to create new services. Each broadcast station keeps information on broadcast programs of its own station in files. Upon a request from a terminal device connected via a network, a broadcast station reads broadcast-program information from the files, and sends the information to the terminal device via the network. In this manner, the terminal device can display a listing of broadcast programs on the display screen with respect to each broadcast station.

Accordingly, there is a need for a broadcast-program-listing transmission device which allows settings to be easily made for automatic receiving/recording of broadcast programs due to go on the air at scheduled future times. Also, there is a need for a terminal device which activates a receiver and/or a recorder according to settings made by the broadcast-program-listing transmission device, wherein the broadcast-program-listing transmission device transmits listings of broadcast programs to the terminal devices connected via a network or the like so as to display the listings of broadcast programs on display screens of the terminal devices.

SUMMARY OF THE INVENTION

Accordingly, it is a general object of the present invention to provide a broadcast-program-listing transmission device and a terminal device which can satisfy the need described above.

It is another and more specific object of the present invention to provide a broadcast-program-listing transmission device which allows settings to be easily made for automatic receiving/recording of broadcast programs due to go on the air at scheduled future times.

In order to achieve the above objects according to the present invention, a device for sending broadcast-program information to a plurality of terminal devices connected via a network so that the plurality of terminal devices display the broadcast-program information on display screens thereof includes an addition unit attaching at least one of a reception setting button and a recording setting button to broadcast-program information which is to be sent to a terminal device, the reception setting button and the recording setting button being used in the terminal device for issuing a request to make settings for automatic receiving and recording, respectively, of a selected broadcast program, an execution-information extracting unit obtaining execution information in response to the request, the execution information specifying information necessary for making the settings, and a transmission unit sending the execution information to the terminal device.

The device described above transmits the broadcast-program information including at least one of the reception setting button and the recording setting button to the terminal device, and further transmits the execution information to the terminal device so as to allow the terminal device to make settings for automatic receiving/recording of a selected broadcast program based on the execution information. This execution information is transmitted from the device in response to a button operation performed on the side of the terminal device. That is, a user of the terminal device needs only a button operation on the reception setting button and/or the recording setting button in order to make the settings. In this manner, settings for automatic receiving/ recording of broadcast programs can be readily made.

It is yet another object of the present invention to provide a terminal device which activates a receiver and/or a recorder according to settings made by the broadcast-program-listing transmission device, wherein the broadcast-program-listing transmission device transmits listings of broadcast programs or the like to the terminal devices connected via a network or the like so as to display the listings of broadcast programs or the like on display screens of the terminal devices.

In order to achieve the above object according to the present invention, a device for receiving broadcast-program information from a transmission device connected via a network and for displaying the broadcast-program information on a display screen includes a receiving unit receiving execution information from the transmission device, the execution information specifying information necessary for making settings for at least one of automatic receiving and automatic recording of a selected broadcast program, a setting-file unit storing the execution information, a check unit checking if a date and time specified in the execution information has arrived, and an instruction unit giving at least one of a first instruction to a receiver to receive the selected broadcast program and a second instruction to a recorder to record the selected broadcast program based on the execution information when the date and time has arrived.

The device as described above can control a receiver to receive broadcast programs and/or a recorder to record broadcast programs based on the execution information sent from the broadcast-program transmission device.

According to one aspect of the present invention, the execution information includes a channel number, an aired or broadcast date, a starting time, and an ending time of the selected broadcast program. Based on this execution information, the device described above can control the receiver and/or the recorder via the instruction unit such as a remote controller to set the channel, turn on the receiver and/or the recorder, and turn off the receiver and/or the recorder.

Other objects and further features of the present invention will be apparent from the following detailed description when read in conjunction with the accompanying drawings.

BRIEF DESCRIPTION OF THE DRAWINGS

FIG. 6 is an illustrative drawing showing a data structure of the setting file of FIG. 3;

FIG. 9 is an illustrative drawing showing an exemplary screen of a listing of television programs which is created after the broadcast-program-information supplying program edits information into a listing format and adds buttons;

FIG. 10 is an illustrative drawing showing an example of an initial-setting screen;

FIG. 12 is an illustrative drawing showing an example of a channel setting screen;

FIG. 13 is an illustrative drawing showing an example of a channel-order setting screen;

FIG. 14 is an illustrative drawing showing an example of a setting screen;

FIG. 15 is an illustrative drawing showing an example of a password setting screen;

FIG. 18 is an illustrative drawing showing an example of a search-condition setting screen;

DESCRIPTION OF THE PREFERRED EMBODIMENTS

In the following, a principle and an embodiment of the present invention will be described with reference to the accompanying drawings.

Figure 1:
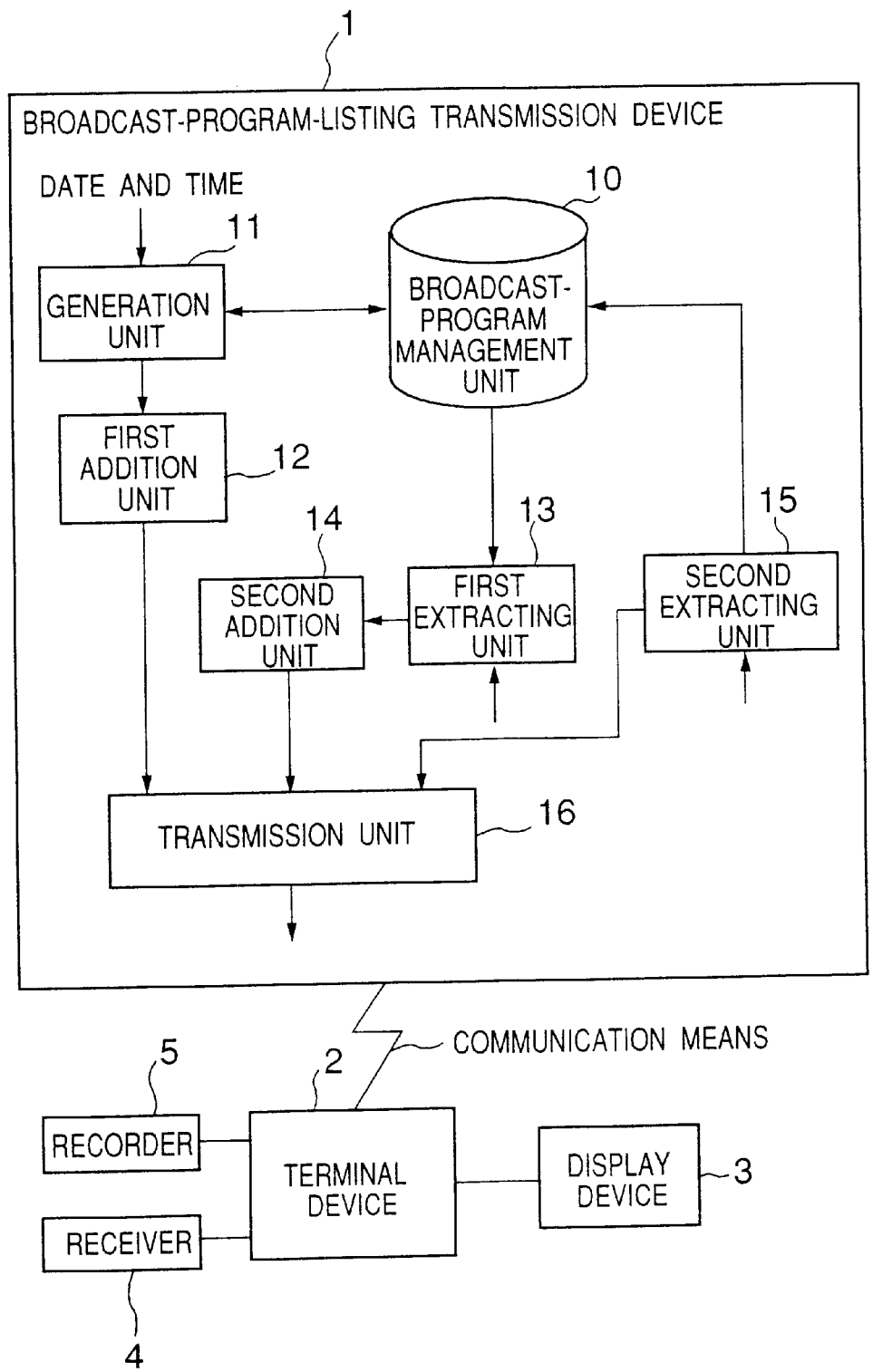
FIG. 1 is a block diagram of a broadcast-program-listing transmission device according to a principle of the present invention shown along with other elements constituting an entire system.

FIG. 1 is a block diagram of a broadcast-program-listing transmission device according to a principle of the present invention shown along with other elements constituting an entire system.

In FIG. 1, a broadcast-program-listing transmission device 1 is connected to a terminal device 2 via a communication means or network such as the Internet. The terminal device 2 is provided with a display device 3. Further, a receiver 4 and a recorder 5 are connected to the terminal device 2.

The configuration of FIG. 1 may vary. The receiver 4 may be integrated with the terminal device 2 to appear as one device. Alternately, the recorder 5 may be integrated with the terminal device 2 so as to be a single device on appearance. Alternately, both the receiver 4 and the recorder 5 are integrated with the terminal device 2 to appear as one device.

The broadcast-program-listing transmission device 1 of FIG. 1 displays a listing of broadcast programs or program-guide information on a display screen of the display device 3 by transmitting the listing of broadcast programs or the program-guide information to the terminal device 2. The broadcast-program-listing transmission device 1 includes a broadcast-program management unit 10, a generation unit 11, a first addition unit 12, a first extracting unit 13, a second addition unit 14, a second extracting unit 15, and a transmission unit 16.

The broadcast-program management unit 10 keeps and manages information about broadcast programs of a plurality of broadcast stations in a random-list format. The generation unit 11 reads information about broadcast programs from the broadcast-program management unit 10 with respect to a date and time indicated by the terminal device 2, and edits the information to generate a listing of broadcast programs which is to be transmitted to the terminal device 2.

The first addition unit 12 attaches shift buttons to all or part of the broadcast programs included in the listing of broadcast programs which is generated by the generation unit 11. The shift buttons are used for giving instructions to display program-guide information about the respective broadcast programs. The first extracting unit 13 extracts program-guide information requested by the terminal device 2 from the broadcast-program management unit 10.

The second addition unit 14 attaches a reception setting button and a recording setting button to the program-guide information extracted by the first extracting unit 13. The reception setting button is used for issuing an instruction to make settings for automatic receiving of a broadcast program due to go on the air at a later time, and the recording setting button is used for giving an instruction to make settings for automatic recording of a broadcast program due to go on the air at a later time. The second extracting unit 15 extracts execution information regarding a broadcast program from the broadcast-program management unit 10. The transmission unit 16 sends the listing of broadcast programs, the program-guide information, or the execution information on the broadcast program to the terminal device 2.

In the broadcast-program-listing transmission device 1 having the configuration of FIG. 1 according to the principle of the present invention, upon an activation from the terminal device 2 indicating a date and time, the generation unit 11 reads broadcast-program information of an indicated date and time from the broadcast-program management unit 10, and edits the information into a listing format to create a listing of broadcast programs. The first addition unit 12 adds shift buttons to the listing of broadcast programs. The transmission unit 16 sends the listing of broadcast programs including the shift buttons to the terminal device 2 which made the request.

Upon receiving the listing of broadcast programs, the terminal device 2 displays the listing of broadcast programs with the shift buttons on the display device 3.

While the listing of broadcast programs is displayed on the display device 3, the terminal device 2 may issue a request via one of the shift buttons to display program-guide information on a particular broadcast program. In response, the first extracting unit 13 extracts the requested program-guide information from the broadcast-program management unit 10. The second addition unit 14 attaches the reception setting button and the recording setting button to the extracted program-guide information. Finally, the transmission unit 16 sends the program-guide information containing the reception setting button and the recording setting button to the terminal device 2 which made the request.

Upon receiving the program-guide information, the terminal device 2 displays the program-guide information with the reception setting button and the recording setting button on the display device 3.

While the program-guide information is displayed on the display device 3, the terminal device 2 may issue a request via the reception setting button or the recording setting button to make settings for automatic receiving or recording, respectively, of a television program. In response, the second extracting unit 15 extracts execution information on the requested television program from the broadcast-program management unit 10. The transmission unit 16 attaches an identification code to the execution information, and sends the execution information to the terminal device 2 which made the request. Here, the identification code is provided for indicating either a reception setting or a recording setting so as to distinguish them.

Figure 2:
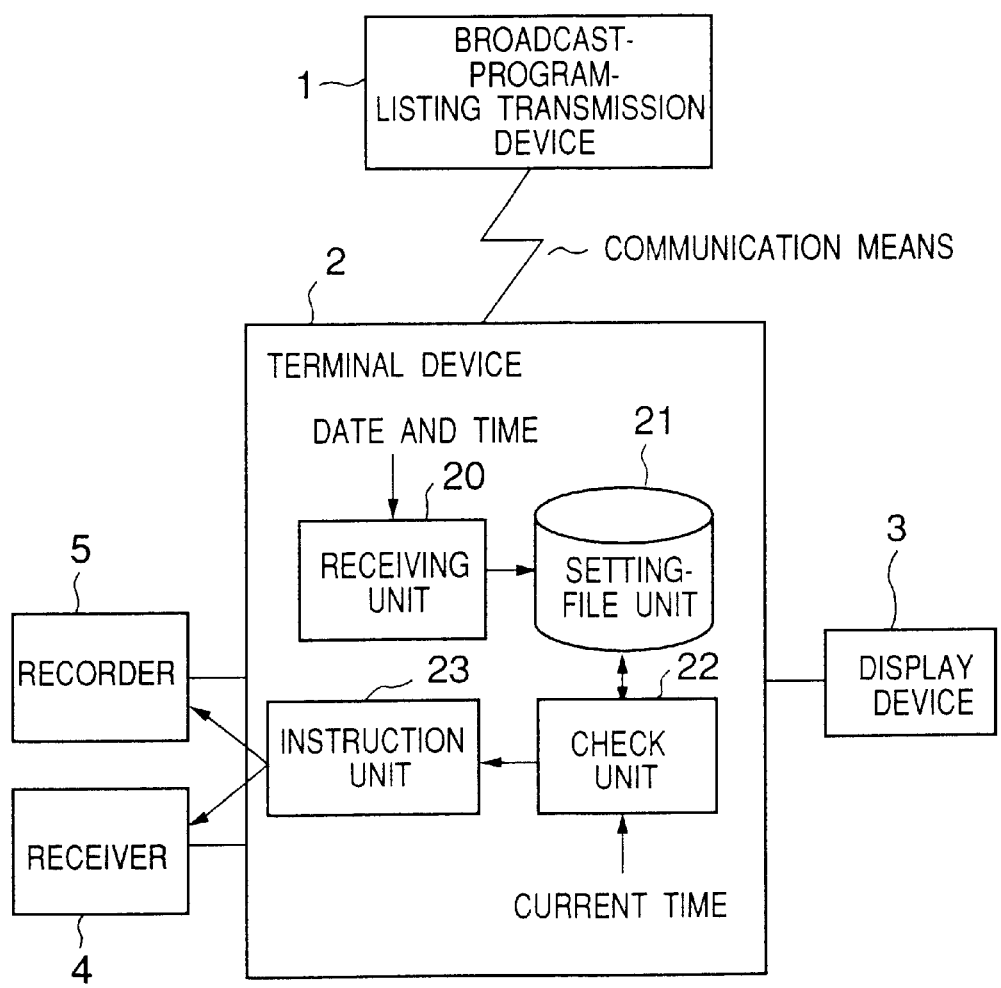
FIG. 2 is a block diagram of the terminal device according to the principle of the present invention shown along with the other elements constituting the entire system.

FIG. 2 is a block diagram of the terminal device according to the principle of the present invention shown along with the other elements constituting the entire system. The terminal device 2 includes a receiving unit 20, a setting-file unit 21, a check unit 22, and an instruction unit 23. The terminal device 2 receives the program-guide information including the reception setting button and the recording setting button from the broadcast-program-listing transmission device 1, and displays the program-guide information with these buttons on the display screen. When the reception setting button is operated, the terminal device 2 sends a request to the broadcast-program-listing transmission device 1 to make settings for automatically receiving a broadcast program. When the recording setting button is operated, the terminal device 2 transmits a request to the broadcast-program-listing transmission device 1 to make settings for automatically recording a broadcast program.

The receiving unit 20 receives the execution information on a requested broadcast program from the broadcast-program-listing transmission device 1 after a request for reception setting or recording setting is made. The setting-file unit 21 stores the execution information received by the receiving unit 20. The check unit 22 checks whether a date and time indicated by the execution information in the setting-file unit 21 has arrived. When this date and time has arrived, the instruction unit 23 instructs the receiver 4 to start receiving the broadcast program, and/or gives an instruction to the recorder 5 to start recording the broadcast program.

In the terminal device 2 having the configuration of FIG. 2 according to the principle of the present invention, the receiving unit 20 receives execution information including an identification code indicative of a reception setting from the broadcast-program-listing transmission device 1 when a request for reception setting is made via the reception setting button. The receiving unit 20 stores the received execution information in the setting-file unit 21. When a request for recording setting is made via the recording setting button, the receiving unit 20 receives execution information including an identification code indicative of a recording setting from the broadcast-program-listing transmission device 1, and stores the received execution information in the setting-file unit 21.

Based on the execution information stored in the setting-file unit 21, the check unit 22 checks whether an indicated date and time has arrived. If the check unit 22 finds that the indicated date and time has arrived, the instruction unit 23 instructs the receiver 4 to start receiving a broadcast program specified in the execution information when this execution information includes an identification code indicative of a reception setting. When the identification code in the execution information indicates a recording setting, the instruction unit 23 gives an instruction to the recorder 5 to start recording the broadcast program specified in the execution information.

Using the broadcast-program-listing transmission device 1 of the present invention in this manner, a user can make settings for automatically receiving and/or recording a broadcast program through a simple button operation. Namely, the reception settings and/or recording settings can be easily made. Further, the terminal device 2 of the present invention makes it possible to automatically receive and/or record the requested broadcast program.

The above description has been provided with reference to a particular example in which the program-guide information has the reception setting button and the recording setting button. Alternately, it may be a listing of broadcast programs which is provided with the reception setting button and the recording setting button. The above example has been given also with respect to the configuration in which both the reception setting button and the recording setting button are provided by the broadcast-program-listing transmission device 1. Alternately, only one of these two buttons may be provided.

In what follows, an embodiment of the present invention will be described with reference to the accompanying drawings.

Figure 3:
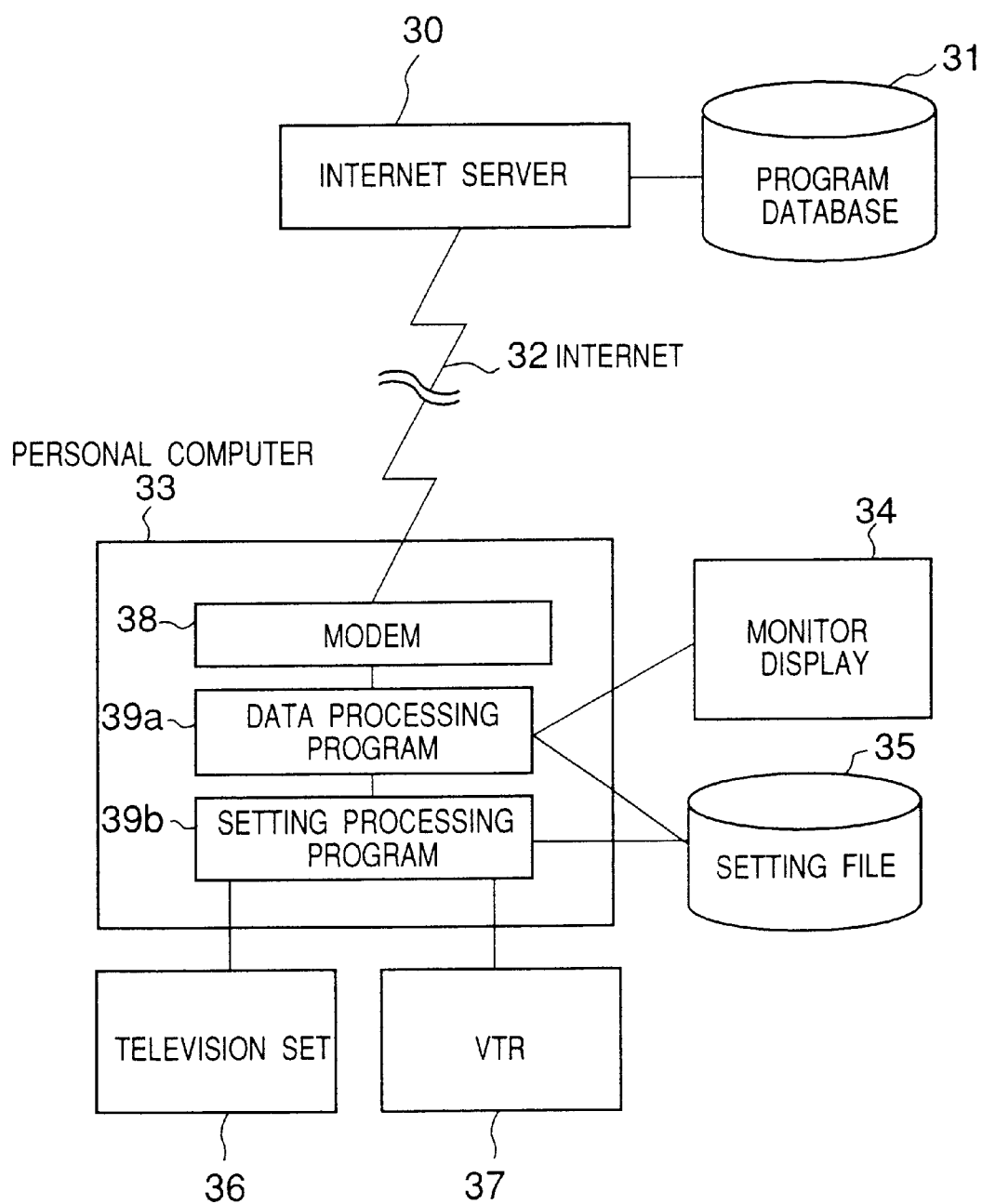
FIG. 3 is a block diagram of an embodiment of a network system according to the present invention.

FIG. 3 is a block diagram of an embodiment of a network system according to the present invention. In FIG. 3, the network system includes an internet server 30, a program database 31 provided for the internet server 30, an Internet 32, a personal computer 33, a monitor display 34 and a setting file 35 provided for the personal computer 33, and a television set 36 and a VTR (video tape recorder) 37 connected to the personal computer 33. Here, the Internet is used merely as an example, and any type of network may be used in place of the Internet.

Figure 4:
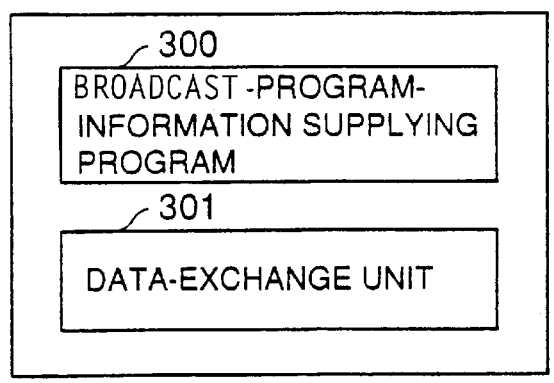
FIG. 4 is a block diagram of the internet server of FIG. 3.

FIG. 4 is a block diagram of the internet server 30 of FIG. 3. The internet server 30 of FIG. 4 includes a broadcast-program-information supplying program 300 and a data-exchange unit 301.

The internet server 30 according to the present invention is connected to the Internet 32. The internet server 30 is provided with the broadcast-program-information supplying program 300 for supplying information on television programs and for helping to make settings for automatic receiving/recording of television programs, and is provided with the data-exchange unit 301 for conducting data exchange with the personal computer 33.

As shown in FIG. 3, the personal computer 33 includes a modem 38, a data processing program 39a, and a setting processing program 39b. The personal computer 33 uses the modem 38 to receive data from the internet server 30, and uses the data processing program 39a to display a listing of television programs from the internet server 30 on the monitor display 34. The data processing program 39a is also used for storing reception/recording setting data from the internet server 30 in the setting file 35. Based on the setting data stored in the setting file 35, the setting processing program 39b controls the television set 36 to receive broadcast, and controls the VTR 37 to record broadcast.

In terms of hardware, a remote controller board may be inserted into one of the slots of the personal computer 33 to control the television set 36 and the VTR 37 via infrared light signals or the like. Such a remote controller board is commercially available, so that a description thereof will be omitted.

Figure 5:
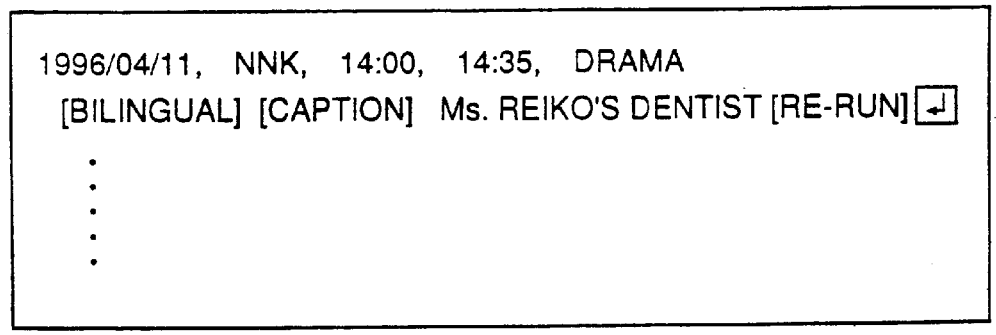
FIG. 5 is an illustrative drawing showing an example of television-program information stored in the program database of FIG. 3.

The broadcast-program-information supplying program 300 of the internet server 30 supplies information about television programs by using television-program information stored in the program database 31. To this end, the program database 31 stores television-program information (an aired date, a name of a television station, an aired time, a category of a television program, a title of the television program, a program guide, etc.) with respect to each television station in a random-list format. FIG. 5 is an illustrative drawing showing an example of the television-program information stored in the program database 31.

Since the program database 31 keeps the television-program information in a random-list format rather than in a table format, the contents of the information can be easily modified. An administrator of the program database 31 is thus able to make an amendment promptly and readily to the information in the program database 31 when there is a change of schedules or contents to the television programs.

Further, the broadcast-program-information supplying program 300 of the internet server 30 generates setting data for automatic receiving/recording of television programs by using the television-program information stored in the program database 31. The generated setting data is stored in the setting file 35. The setting file 35 stores an aired date, a starting time, an ending time, a channel number of a television station, and an identification code for each television program which is to be received and/or recorded. The identification code is used for indicating which one of the television set 36 and the VTR 37 is to be operated. FIG. 6 is an illustrative drawing showing a data structure of the setting file 35.

Figure 7:
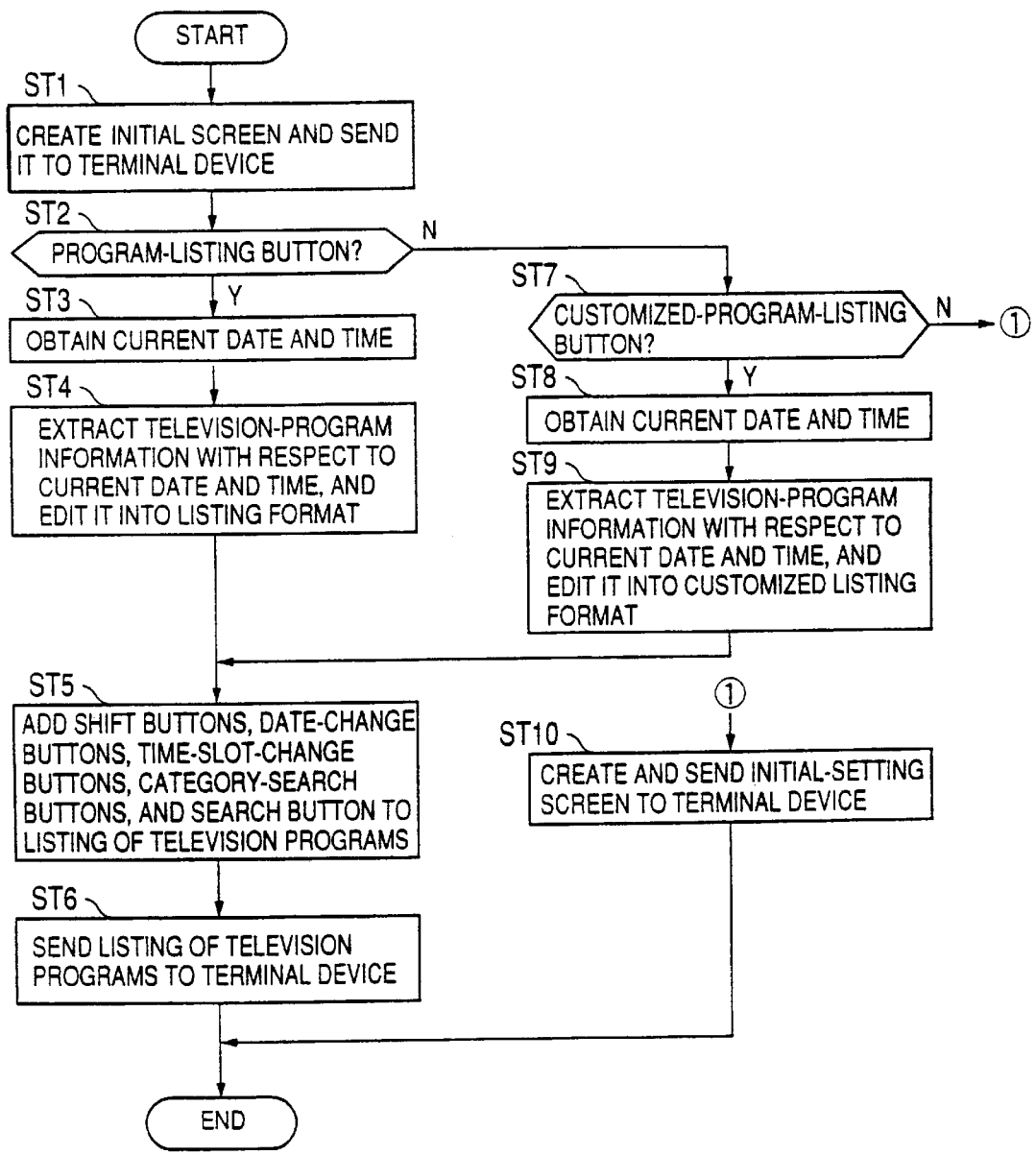
FIG. 7 is a flowchart of a process of the broadcast-program-information supplying program of FIG. 4.

FIG. 7 is a flowchart of a process of the broadcast-program-information supplying program 300. In the following, the present invention will be described in detail with reference to this flowchart.

At a step ST1, upon an activation request from a user operating the personal computer 33, the broadcast-program-information supplying program 300 creates an initial screen and sends it to the personal computer (terminal device) 33, so that the initial screen is displayed on the monitor display 34 of the personal computer 33.

Figure 8:
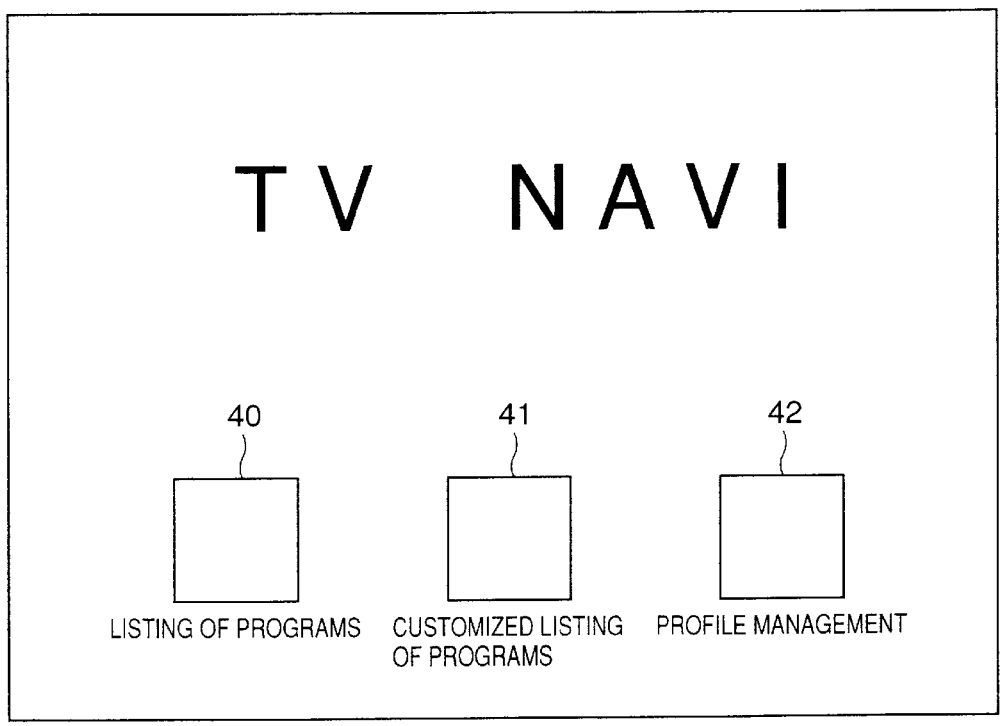
FIG. 8 is an illustrative drawing showing an example of an initial screen.

FIG. 8 is an illustrative drawing showing an example of the initial screen. As shown in FIG. 8, the initial screen includes a program-listing button 40, a customized-program-listing button 41, and a profile-management button 42. These buttons have an assigned URL (a symbol indicating a place of a resource in the Internet 32) in connection with the broadcast-program-information supplying program 300. When the user operates these buttons, operations on these buttons are sent to the broadcast-program-information supplying program 300 so that the broadcast-program-information supplying program 300 is informed of these operations.

At a step ST2, the broadcast-program-information supplying program 300 checks whether an operation is made by the user on the program-listing button 40. If it is, the procedure goes to a step ST3. Otherwise, the procedure goes to a step ST7.

At the step ST3, the broadcast-program-information supplying program 300 obtains a current date and time.

At a step ST4, the broadcast-program-information supplying program 300 extracts television-program information from the program database 31 with respect to the current date and time, and edits the extracted information into a listing format.

At a step ST5, the broadcast-program-information supplying program 300 adds shift buttons, date-change buttons, time-slot-change buttons, category-search buttons, and a search button to the listing of television programs so as to create a screen of the listing of television programs.

At a step ST6, the broadcast-program-information supplying program 300 sends the screen of a listing of television programs to the personal computer 33, so that the monitor display 34 of the personal computer 33 displays the listing of television programs.

FIG. 9 is an illustrative drawing showing an exemplary screen of a listing of television programs which is created after the broadcast-program-information supplying program 300 edits the information into a listing format and adds the buttons. As shown in the FIG. 9, the screen of a listing of television programs shows television programs in a table format which are aired by each television station on the indicated date during a time slot of the indicated time.

As shown in FIG. 9, the screen of a listing of television programs includes shift buttons 50, date-change buttons 51, time-slot-change buttons 52, category-search buttons 53, and a search button 54. The shift buttons 50 are provided for respective television programs (only one shift button is shown in the figure for the sake of clarity), and are used for giving an instruction to display a screen which shows details of the selected television program. The date-change buttons 51 are used for issuing an instruction to change the date of displayed information, and include change buttons for changing the date by one week and other change buttons for changing the day. The time-slot-change buttons 52 are used for giving an instruction to change the displayed time slot, and includes change buttons for changing the time slot by a unit of two hours. The category-search buttons 53 are provided for respective television-program categories, and are used for issuing an instruction to search for television programs classified in a selected category. The search button 54 is used for giving an instruction to search for television programs. These buttons have an assigned URL in connection with the broadcast-program-information supplying program 300.

With reference to FIG. 7 again, at the step ST7, when it turns out at the step ST2 that the button operated by the user is not the program-listing button 40, the broadcast-program-information supplying program 300 checks whether the button operated by the user is the customized-program-listing button 41. If it is, the procedure goes to a step ST8. Otherwise, the procedure goes to a step ST10.

At the step ST8, the broadcast-program-information supplying program 300 obtains a current date and time.

At the step ST9, the broadcast-program-information supplying program 300 extracts television-program information from the program database 31 with respect to the current date and time, and edits the extracted information into a customized listing format in accordance with the customized-program-listing instruction.

The customized-program-listing instruction is used for displaying a listing of television programs with contents which are customized by the user. As will be described later, a selection of contents are made by the user interactively operating a setting screen, which is displayed upon a selection of the profile-management button 42.

With reference to FIG. 7 again, at the step ST5 following the step ST9, the broadcast-program-information supplying program 300 adds the shift buttons 50, the date-change buttons 51, the time-slot-change buttons 52, the category-search buttons 53, and the search button 54 so as to create a screen of a customized listing of television programs.

At the step ST6, the broadcast-program-information supplying program 300 sends the screen of a customized listing of television programs to the personal computer 33, so that the monitor display 34 of the personal computer 33 displays the customized listing of television programs.

At the step ST10, when it turns out at the step ST7 that the button operated by the user is not the customized-program-listing button 41, i.e., when it is found that the operated button is the profile-management button 42, the broadcast-program-information supplying program 300 creates and sends an initial-setting screen to the personal computer 33, so that the monitor display 34 of the personal computer 33 displays the initial-setting screen.

FIG. 10 is an illustrative drawing showing an example of the initial-setting screen. As shown in FIG. 10, the initial-setting screen includes a standard button 60 and modify buttons 61 through 63. The standard button 60 is used for issuing an instruction to assign channel numbers to television stations and decide an order of displayed television stations according to a standard format. The modify button 61 is used for giving an instruction to assign nonstandard channel numbers to the television stations and change an order of the displayed television stations. The modify button 62 is used for making a request to change customized categories, customized time, and a start-up screen. The modify button 63 is used for issuing a request to change a password. A URL is assigned to each of these buttons in connection with the broadcast-program-information supplying program 300.

In this manner, the broadcast-program-information supplying program 300, upon an activation request from the user, carries out the process shown in the flowchart of FIG. 7 so as to create a screen of a listing of television programs which are aired by each television station on the current date and time. The created screen of the listing of television programs is displayed on the monitor display 34 of the personal computer 33. Alternately, a screen of a customized listing of television programs may be created and displayed on the monitor display 34 of the personal computer 33.

Figure 11A:
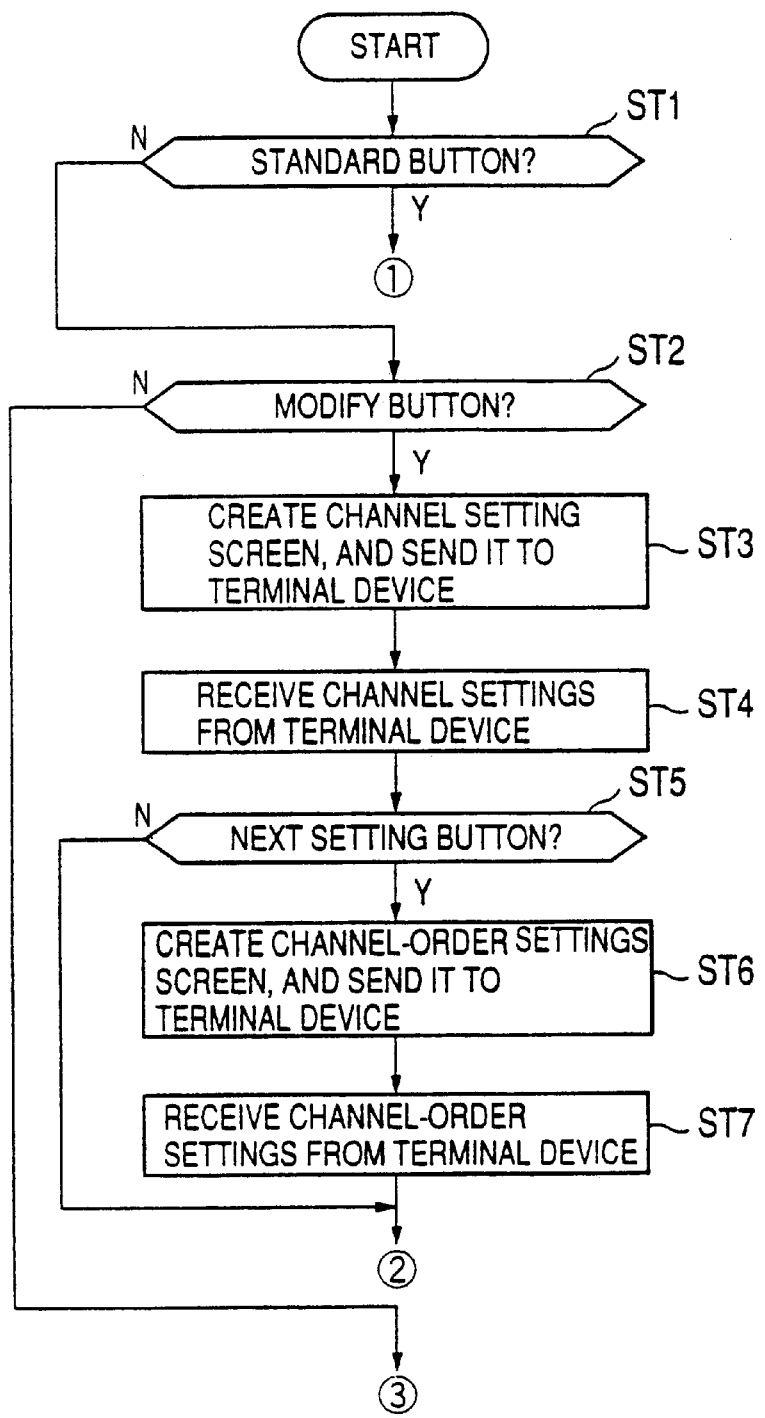
FIGS. 11A and 11B are a flowchart of a process carried out by the broadcast-program-information supplying program when the initial-setting screen of FIG. 10 is displayed on a monitor display.
Figure 11B:
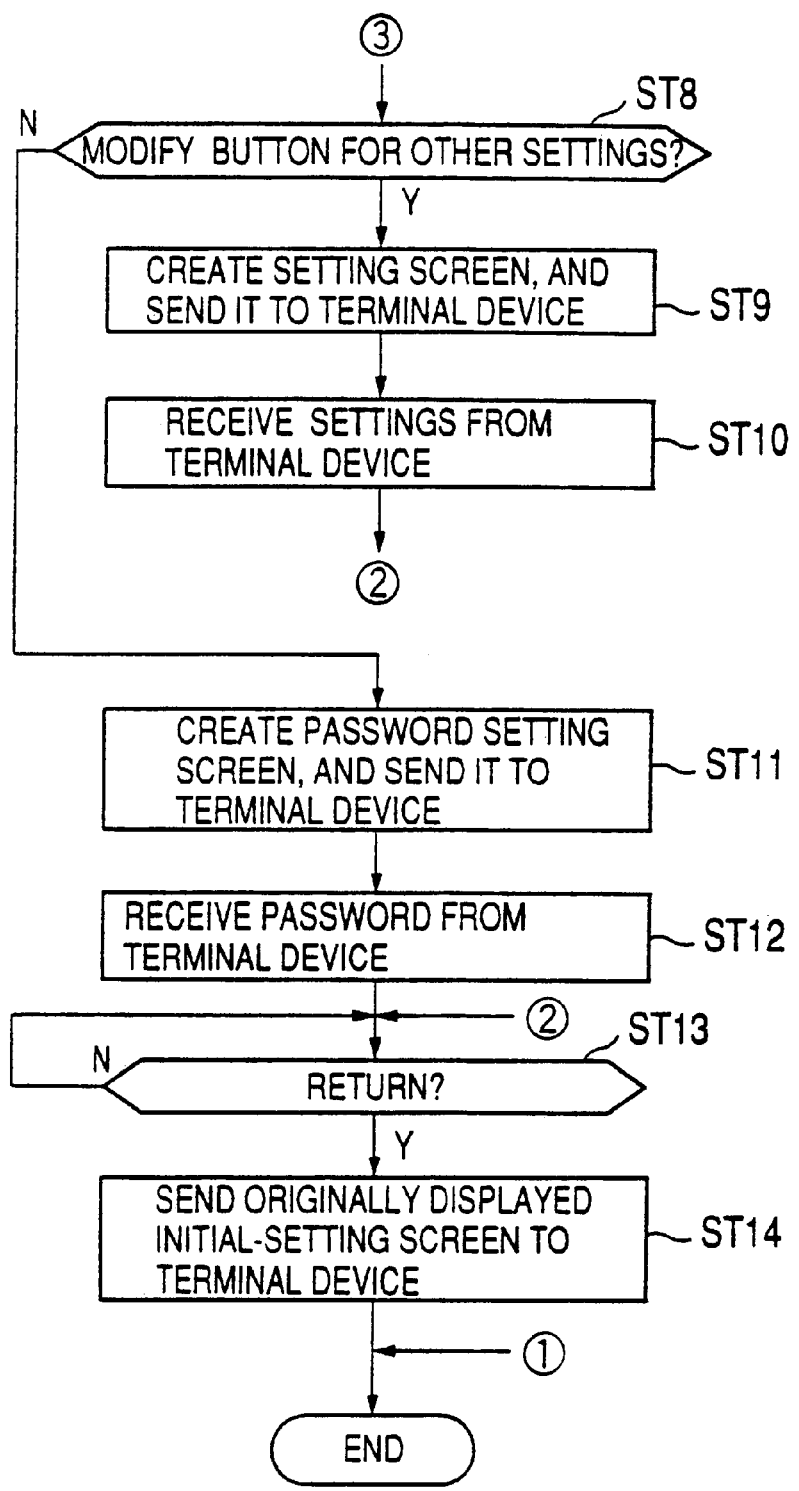

FIGS. 11A and 11B are a flowchart of a process carried out by the broadcast-program-information supplying program 300 when the initial-setting screen of FIG. 10 is displayed on the monitor display 34. This process will be described below with reference to FIGS. 11A and 11B.

At a step ST1, upon a user operation of a button when an initial-setting screen is displayed on the monitor display 34 of the personal computer 33, the broadcast-program-information supplying program 300 checks whether the operated button is the standard button 60 (which is used for giving an instruction to assign channel numbers to television stations and decide an order of displayed television stations according to a standard format). If it is, the procedure ends because the use of the available standard format requires no further instructions from the user. If the operated button is not the standard button 60, the procedure goes to a step ST2.

At the step ST2, broadcast-program-information supplying program 300 checks whether the operated button is the modify button 61 (which is used for assigning non-standard channel numbers to television stations and displaying the television stations in a customized order). If it is, the procedure goes to a step ST3. Otherwise, the procedure goes to a step ST8.

At the step ST3, the broadcast-program-information supplying program 300 creates a channel setting screen used for assigning channel numbers to television stations, and sends it to the personal computer 33 so that the personal computer 33 displays the channel setting screen on the monitor display 34. FIG. 12 is an illustrative drawing showing an example of the channel setting screen.

At a step ST4, the broadcast-program-information supplying program 300 receives channel settings from the personal computer 33 when the user selects a channel number with respect to each television station on the channel setting screen.

At a step ST5, the broadcast-program-information supplying program 300 checks whether the next setting button on the channel setting screen is operated, thereby checking whether an instruction is given to modify an order of displayed television stations. If it is, the procedure goes to a step ST6. Otherwise, the procedure goes to a step ST13.

At the step ST6, the broadcast-program-information supplying program 300 creates a channel-order setting screen used for setting an order of displayed television stations, and sends it to the personal computer 33 so that the personal computer 33 displays the channel-order setting screen on the monitor display 34. FIG. 13 is an illustrative drawing showing an example of the channel-order setting screen.

At a step ST7, the broadcast-program-information supplying program 300 receives channel-order settings from the personal computer 33 when the user enters channel orders into the channel-order setting screen. Here, according to the configuration of this embodiment, a given television station is not displayed when no channel order is provided for this television station.

At the step ST13, following the step ST7 or when it is found at the step ST5 that no instruction to modify the order of displayed television stations is given, the broadcast-program-information supplying program 300 checks whether a return button on the channel setting screen or the channel-order setting screen is operated. If it is, the procedure goes to a step ST14. Otherwise, the procedure comes back to the step ST13 so as to wait until the return button is selected.

At the step ST14, the broadcast-program-information supplying program 300 sends the initial-setting screen originally displayed to the personal computer 33, so that the monitor display 34 of the personal computer 33 displays the initial-setting screen as it was displayed before.

At the step ST8, when it turns out at the step ST2 that the operated button is not the modify button 61, the broadcast-program-information supplying program 300 checks whether the operated button is the modify button 62 (which is used for modifying customized categories, customized time slots, or a start-up screen). If it is, the procedure goes to a step ST9. Otherwise, the procedure goes to a step ST11.

At the step ST9, the broadcast-program-information supplying program 300 creates a setting screen which is used for setting customized categories (only the television programs falling into these categories will be displayed on a listing of television programs), customized time slots (only the television programs in these time slots will be displayed on a listing of television programs), and a start-up screen (this start-up screen will be displayed at the time of starting up). The broadcast-program-information supplying program 300 sends the setting screen to the personal computer 33 so that the personal computer 33 displays the setting screen on the monitor display 34. FIG. 14 is an illustrative drawing showing an example of the setting screen.

At a step ST10, the broadcast-program-information supplying program 300 receives settings from the personal computer 33 when the user enters these settings through the setting screen.

At the step ST13 following the step ST10, the broadcast-program-information supplying program 300 checks whether a return button on the setting screen is operated. If it is, the procedure goes to the step ST14. Otherwise, the procedure comes back to the step ST13 so as to wait until the return button is selected.

At the step ST14, the broadcast-program-information supplying program 300 sends the initial-setting screen originally displayed to the personal computer 33, so that the monitor display 34 of the personal computer 33 displays the initial-setting screen as it was displayed before.

At a step ST11, when it is found at the step ST8 that the operated button is not the modify button 62, and, thus, should be the modify button 63 (used for modifying a password), the broadcast-program-information supplying program 300 creates a password setting screen used for setting a password, and sends it to the personal computer 33 so that the personal computer 33 displays the password setting screen on the monitor display 34. FIG. 15 is an illustrative drawing showing an example of the password setting screen.

At the step ST12, the broadcast-program-information supplying program 300 receives a password when the user enters the password into the password setting screen.

At the step ST13 following the step ST12, the broadcast-program-information supplying program 300 checks whether a return button (an OK button or a CANCEL button) on the password setting screen is operated. If it is, the procedure goes to the step ST14. Otherwise, the procedure comes back to the step ST13 so as to wait until the return button is selected.

At the step ST14, the broadcast-program-information supplying program 300 sends the initial-setting screen originally displayed to the personal computer 33, so that the monitor display 34 of the personal computer 33 displays the initial-setting screen as it was displayed before.

In this manner, upon a user operation on a button when the initial-setting screen as shown in FIG. 10 is displayed on the monitor display 34 of the personal computer 33, the broadcast-program-information supplying program 300 carries out the process of the flowchart of FIGS. 11A and 11B so as to obtain setting information necessary for creating a desired listing of television programs.

As described above, when the broadcast-program-information supplying program 300 detects a user operation on the customized-program-listing button 41 when the initial screen as shown in FIG. 8 is on display, the broadcast-program-information supplying program 300 creates a customized listing of television programs in accordance with the setting information described above, so as to let the personal computer 33 display the customized listing on the monitor display 34.

Figure 16A:
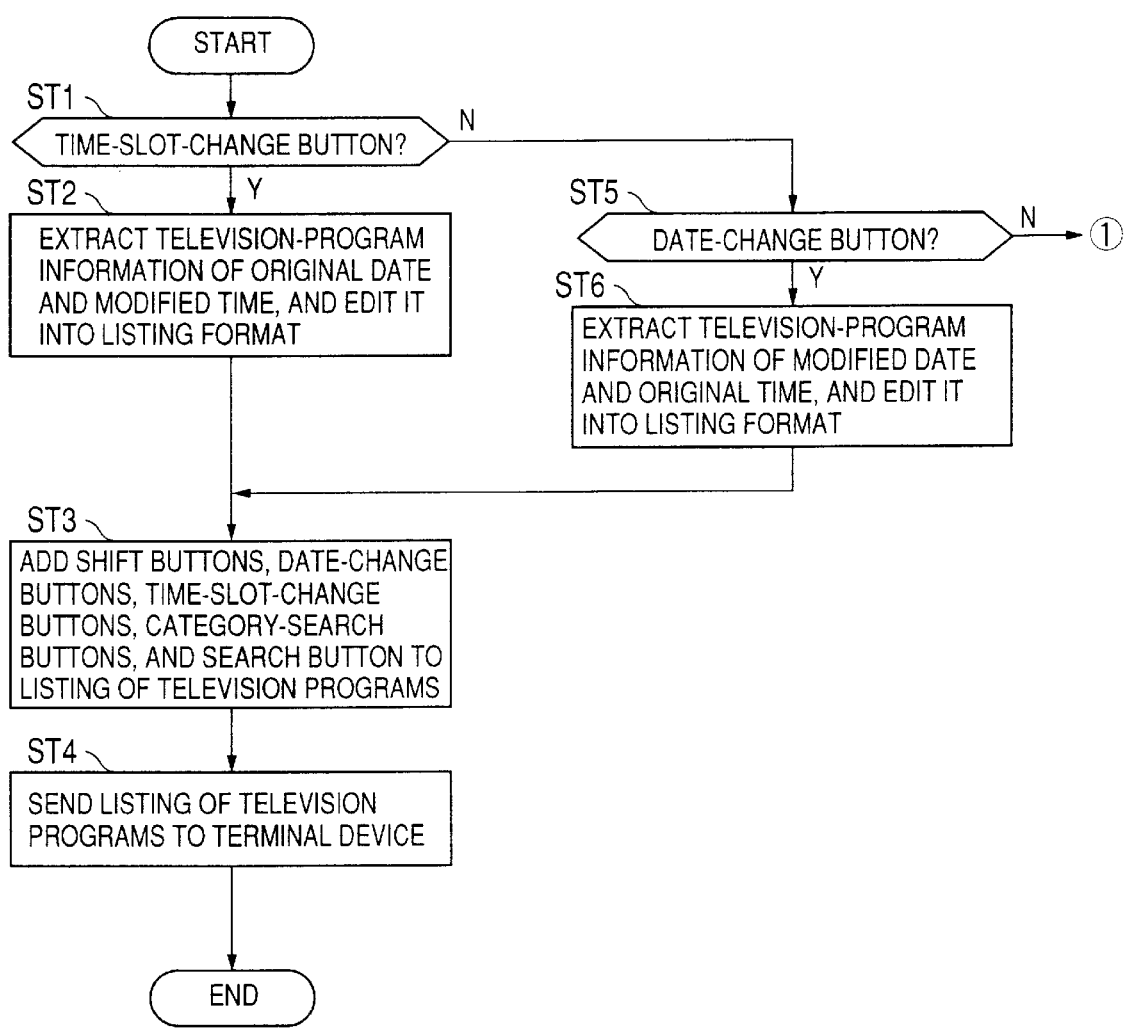
FIGS. 16A through 16C are a flowchart of a process which is carried out by the broadcast-program-information supplying program when a listing of television programs is displayed on the monitor display.
Figure 16B:
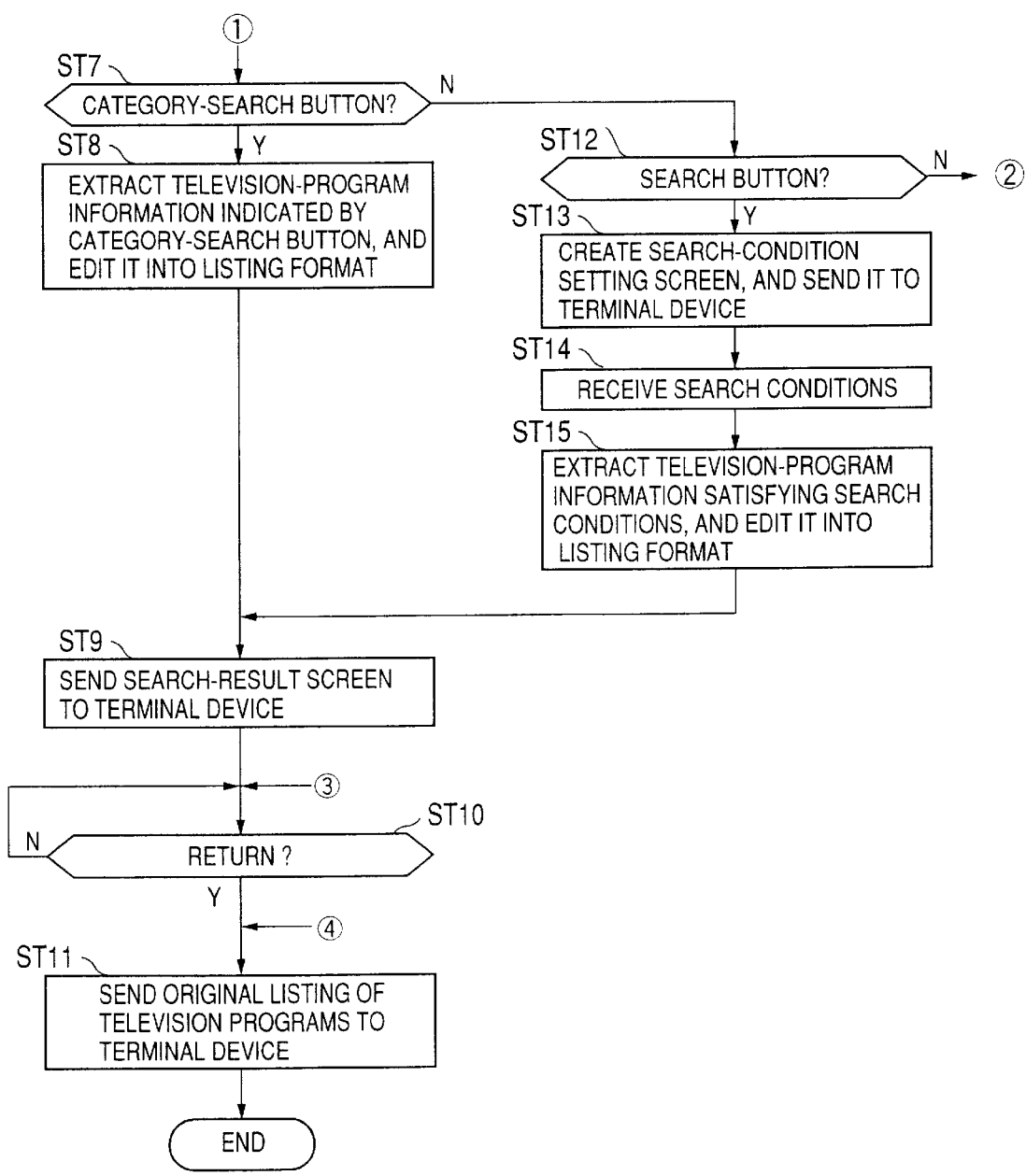
Figure 16C:
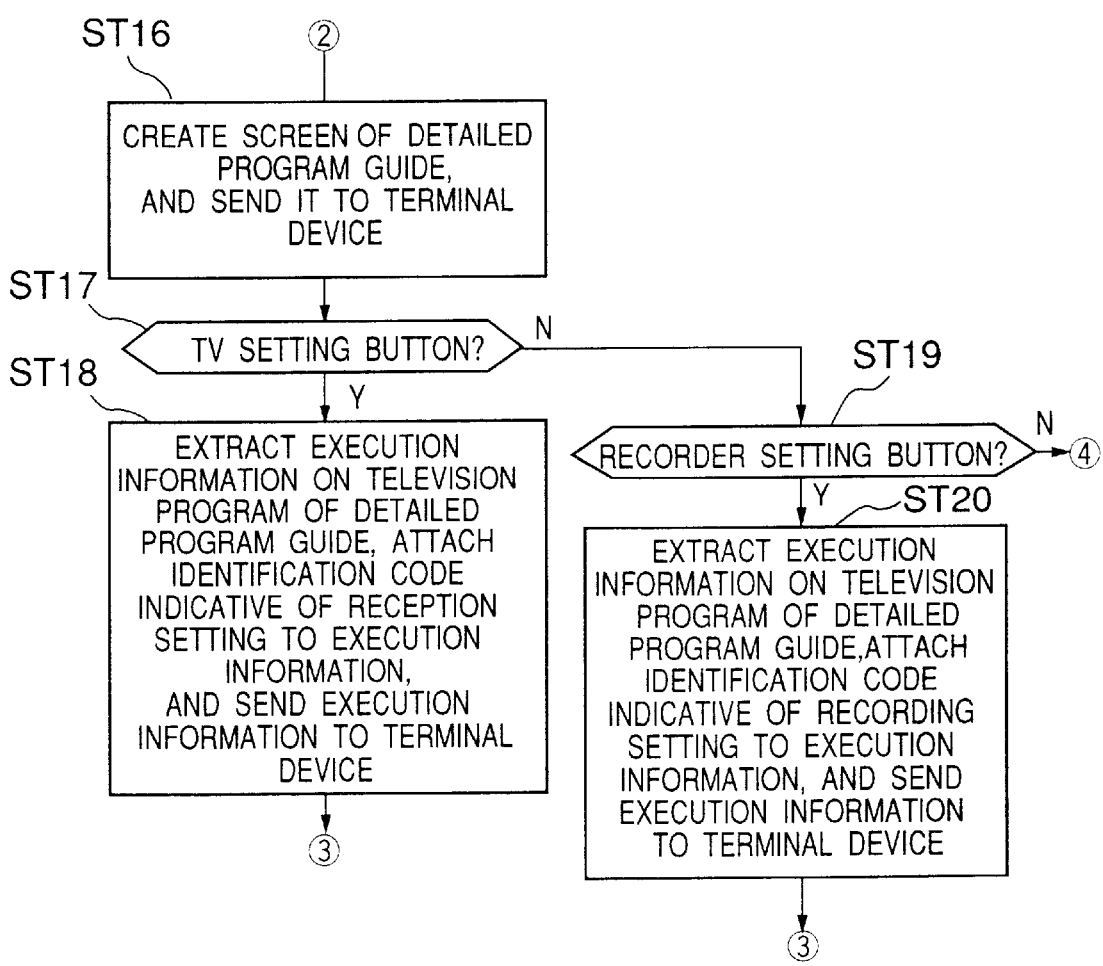

FIGS. 16A through 16C are a flowchart of a process which is carried out by the broadcast-program-information supplying program 300 when a listing of television programs (such as shown in FIG. 9) is displayed on the monitor display 34. This process will be described below with reference to FIGS. 16A through 16C.

At a step ST1, upon a user operation on a button when a listing of the television programs is displayed on the monitor display 34 of the personal computer 33, the broadcast-program-information supplying program 300 checks whether the operated button is one of the time-slot-change buttons 52. If it is, the procedure goes to a step ST2. Otherwise, the procedure goes to a step ST5.

At the step ST2, the broadcast-program-information supplying program 300 extracts the television-program information of an original date and modified time from the program database 31, and edits the information into a listing format.

At a step ST3, the broadcast-program-information supplying program 300 adds the shift buttons 50, the date-change buttons 51, the time-slot-change buttons 52, the category-search buttons 53, and the search button 54 to the listing of television programs of each television station so as to create a screen of a listing of television programs.

At a step ST4, the broadcast-program-information supplying program 300 sends the screen of a listing of television programs to the personal computer 33, so that the monitor display 34 of the personal computer 33 displays the listing of television programs in accordance with the request.

In this manner, operating the time-slot-change buttons 52, the user can obtain a listing of television programs with respect to a time period in which the user wishes to watch television.

At the step ST5, when it is found at the step ST1 that the button operated by the user is not the time-slot-change buttons 52, the broadcast-program-information supplying program 300 checks whether the operated button is one of the date-change buttons 51. If it is, the procedure goes to a step ST6. Otherwise, the procedure goes to a step ST7 (FIG. 16B).

At the step ST6, the broadcast-program-information supplying program 300 extracts the television-program information of a modified date and original time from the program database 31, and edits the information into a listing format.

At the step ST3 following the step ST6, the broadcast-program-information supplying program 300 adds the shift buttons 50, the date-change buttons 51, the time-slot-change buttons 52, the category-search buttons 53, and the search button 54 to the listing of television programs of each television station so as to create a screen of a listing of television programs.

At the step ST4, the broadcast-program-information supplying program 300 sends the screen of a listing of television programs to the personal computer 33, so that the monitor display 34 of the personal computer 33 displays the listing of television programs in accordance with the request.

In this manner, operating the date-change buttons 51, the user can obtain a listing of television programs with respect to a desired date.

At the step ST7 (FIG. 16B), when it is found at the step ST5 that the button operated by the user is not the date-change buttons 51, the broadcast-program-information supplying program 300 checks whether the operated button is one of the category-search buttons 53. If it is, the procedure goes to a step ST8. Otherwise, the procedure goes to a step ST12.

At the step ST8, the broadcast-program-information supplying program 300 extracts the television-program information from the program database 31 such that television programs of the extracted information fall into a category indicated by the selected one of the category-search buttons 53, and edits the extracted information into a predetermined listing format to create a search-result screen.

At a step ST9, the broadcast-program-information supplying program 300 sends the search-result screen to the personal computer 33, so that the monitor display 34 of the personal computer 33 displays the search-result screen which lists the television programs falling into the requested program category.

At a step ST10, the broadcast-program-information supplying program 300 checks whether a return button on the search-result screen is clicked. If it is, the procedure goes to a step ST11. Otherwise, the procedure comes back to the step ST10 so as to wait until the return button is operated.

At the step ST11, the broadcast-program-information supplying program 300 sends the original screen of a listing of television programs to the personal computer 33, so that the monitor display 34 of the personal computer 33 displays the original listing of television programs.

Figure 17:
FIG. 17 is an illustrative drawing showing an example of a listing of drama programs.

In this manner, if the user wishes to look through information about drama programs, for example, the user can obtain a listing of drama programs by operating one of the category-search buttons 53 which is provided for searching for drama programs. FIG. 17 is an illustrative drawing showing an example of a listing of drama programs.

At the step ST12, when it is found at the step ST7 that the button operated by the user is not the category-search buttons 53, the broadcast-program-information supplying program 300 checks whether the operated button is the search button 54. If it is, the procedure goes to a step ST13. Otherwise, the procedure goes to a step ST16.

At the step ST13, the broadcast-program-information supplying program 300 creates a search-condition setting screen, and sends it to the personal computer 33, so that the monitor display 34 of the personal computer 33 displays the search-condition setting screen.

FIG. 18 is an illustrative drawing showing an example of the search-condition setting screen. As shown in the FIG. 10, the search-condition setting screen includes a field for setting a time span for a search, a field for setting a time slot for a search, a field for setting a program category to be searched for, and a field for setting one or more television stations to be included in a search.

At a step ST14 following the step ST13, the broadcast-program-information supplying program 300 receives data of search conditions entered through the search-condition setting screen.

At a step ST15, the broadcast-program-information supplying program 300 extracts the television-program information from the program database 31 such that television programs of the extracted information satisfies the received search conditions, and edits the extracted information into a predetermined listing format to create a search-result screen.

At the step ST9 following the step ST15, the broadcast-program-information supplying program 300 sends the search-result screen to the personal computer 33, so that the monitor display 34 of the personal computer 33 displays the search-result screen which lists the television programs which the user wishes to watch.

At the step ST10, the broadcast-program-information supplying program 300 checks whether a return button on the search-result screen is clicked. If it is, the procedure goes to the step ST11. Otherwise, the procedure comes back to the step ST10 so as to wait until the return button is operated.

At the step ST11, the broadcast-program-information supplying program 300 sends the original screen of a listing of television programs to the personal computer 33, so that the monitor display 34 of the personal computer 33 displays the original listing of television programs.

In this manner, the user can obtain a listing of television programs which the user wishes to watch by operating the search button 54 and entering search conditions through the search-condition setting screen to search for the listing of television programs which satisfy the entered search conditions. FIG. 17 shows an example of such a listing of television programs.

At the step ST16, when it is found at the step ST12 that the button operated by the user is not the search button 54 and, thus, should be one of the shift buttons 50, the broadcast-program-information supplying program 300 extracts detailed information on a television program indicated by the selected one of the shift buttons 50 from the program database 31 to create a screen of a detailed program guide, and sends this screen of a detailed program guide to the personal computer 33. In response, the personal computer 33 displays the screen of a detailed program guide on the monitor display 34.

Figure 19:
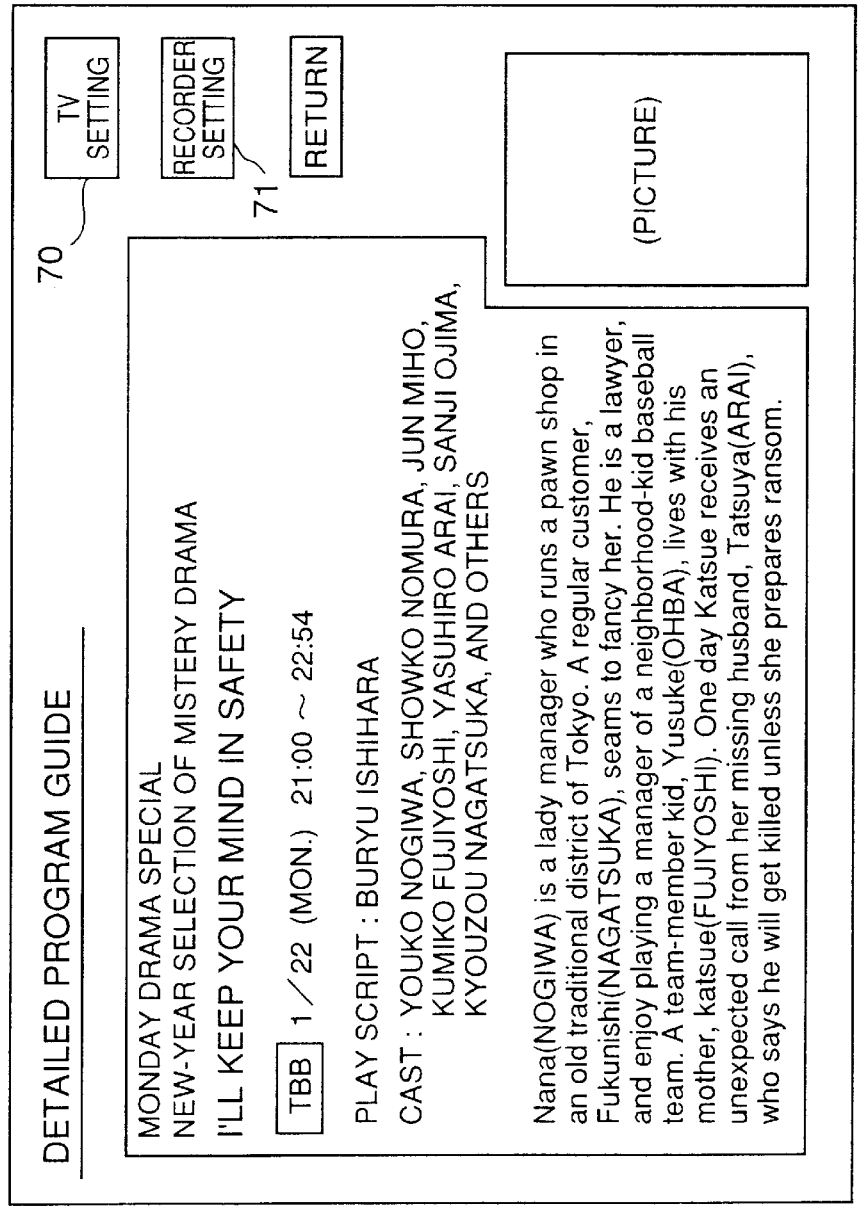
FIG. 19 is an illustrative drawing showing an example of the screen of a detailed program guide.

FIG. 19 is an illustrative drawing showing an example of the screen of a detailed program guide. As shown in the FIG. 19, the screen of a detailed program guide displays detailed information on a requested television program, and includes a TV setting button 70 for requesting setting of automatic receiving of the television program and a recorder setting button 71 for requesting setting of automatic recording of the television program. These buttons have an assigned URL in connection with the broadcast-program-information supplying program 300.

With reference to FIG. 16C again, at a step ST17, the broadcast-program-information supplying program 300 checks whether a button operated by the user is the TV setting button 70. If it is, the procedure goes to a step ST18. Otherwise, the procedure goes to a step ST19.

At the step ST18, the broadcast-program-information supplying program 300 extracts an aired date, a starting time, an ending time, and a channel number of the television station with respect to the television program of the detailed program guide from the program database 31. The broadcast-program-information supplying program 300 also attaches an identification code indicative of a reception setting to the extracted information, and, then, sends the extracted information (execution information) to the personal computer 33. In response, the personal computer 33 stores the execution information about the television program in the setting file 35.

At the step ST10 (FIG. 16B) following the step ST18, the broadcast-program-information supplying program 300 checks whether a return button on the screen of a detailed program guide is clicked. If it is, the procedure goes to the step ST11. Otherwise, the procedure comes back to the step ST10 so as to wait until the return button is operated.

At the step ST11, the broadcast-program-information supplying program 300 sends the original screen of a listing of television programs to the personal computer 33, so that the monitor display 34 of the personal computer 33 displays the original listing of television programs.

At the step ST19, when it is found at the step ST17 that the operated button is not the TV setting button 70, the broadcast-program-information supplying program 300 checks whether the operated button is the recorder setting button 71. If it is, the procedure goes to a step ST20. Otherwise, the procedure goes to the step ST11 (FIG. 16B).

At the step ST20, the broadcast-program-information supplying program 300 extracts an aired date, a starting time, an ending time, and a channel number of the television station with respect to the television program of the detailed program guide from the program database 31. The broadcast-program-information supplying program 300 also attaches an identification code indicative of a recording setting to the extracted information, and, then, sends the extracted information (execution information) to the personal computer 33. In response, the personal computer 33 stores the execution information about the television program in the setting file 35.

At the step ST10 (FIG. 16B) following the step ST20, the broadcast-program-information supplying program 300 checks whether the return button on the screen of a detailed program guide is clicked. If it is, the procedure goes to the step ST11. Otherwise, the procedure comes back to the step ST10 so as to wait until the return button is operated.

At the step ST11, the broadcast-program-information supplying program 300 sends the original screen of a listing of television programs to the personal computer 33, so that the monitor display 34 of the personal computer 33 displays the original listing of television programs.

When it turns out at the step ST19 that the operated button is not the recorder setting button 71, and, thus, should be the return button on the detailed program guide, the procedure goes to the step ST11, where the original screen of a listing of television programs is supplied to the personal computer 33. In response, the personal computer 33 displays the original listing of television programs on the monitor display 34.

In this manner, upon a user operation on a button when a listing of television programs as shown in FIG. 9 is displayed on the monitor display 34 of the personal computer 33, the broadcast-program-information supplying program 300 carries out the process of the flowchart of FIGS. 16A through 16C so as to display a listing of television programs of a desired date, a listing of television programs of a desired time slot, a listing of television programs of a desired category obtained by a search, a listing of desired television programs obtained by a search, or a detailed program guide to a desired television program.

When the user operates the TV setting button 70 of the detailed program guide to request reception settings, an aired date, a starting time, an ending time, and a channel number of the television station are extracted from the program database 31 with respect to the pertinent television program. The extracted information is then sent to the personal computer 33 along with an attached identification code indicative of a reception setting. When the user operates the recorder setting button 71 of the detailed program guide to request recording settings, an aired date, a starting time, an ending time, and a channel number of the television station are extracted from the program database 31 with respect to the pertinent television program. The extracted information is then send to the personal computer 33 along with an attached identification code indicative of a recording setting. As a result, the setting data as shown in FIG. 6 is stored in the setting file 35 of the personal computer 33.

Figure 20:
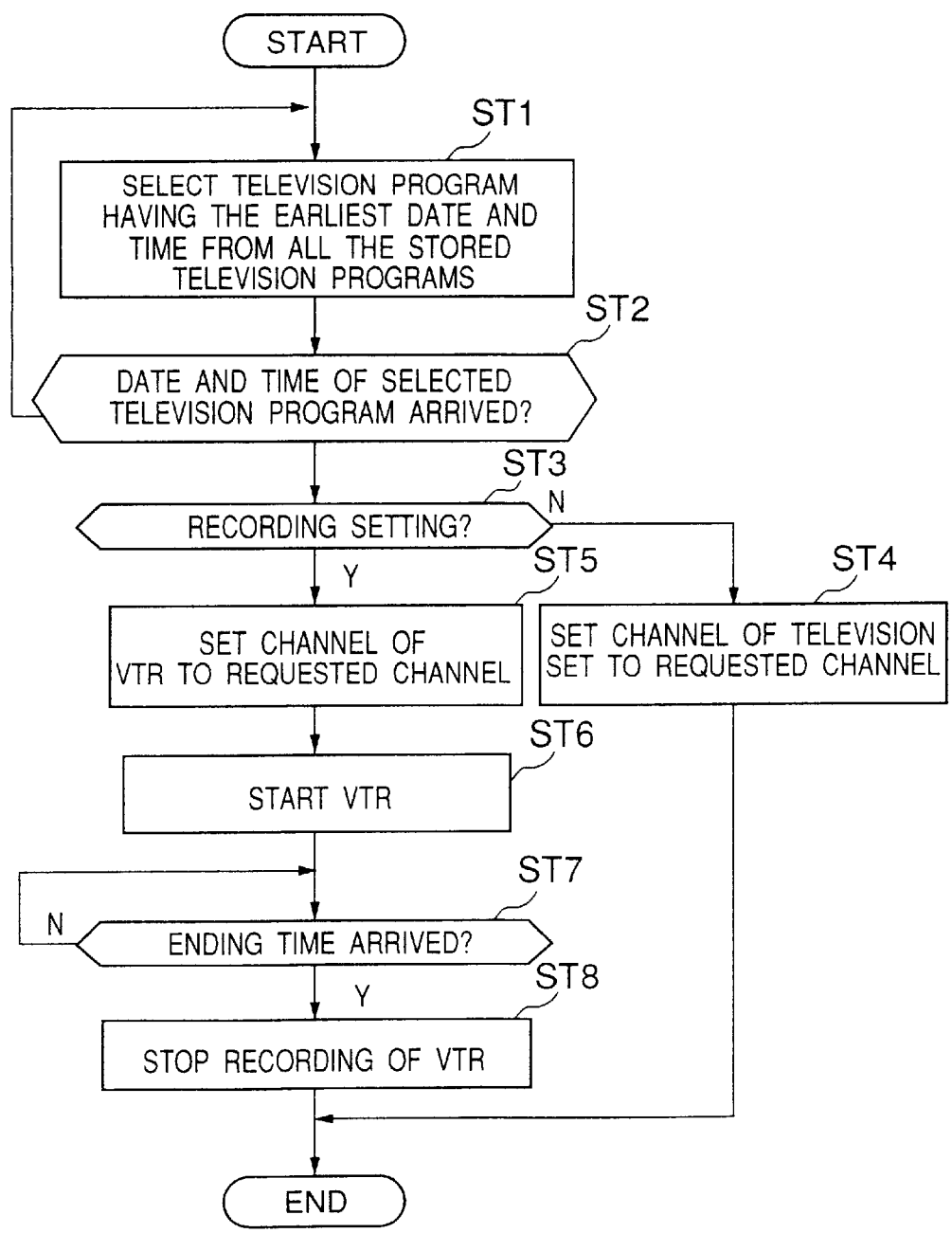
FIG. 20 is a flowchart of a process carried out by the setting processing program of the personal computer shown in FIG. 3.

FIG. 20 is a flowchart of a process carried out by the setting processing program 39b of the personal computer 33. This process will be described below.

At a step ST1, the setting processing program 39b selects a television program having the earliest date and time from all the television programs of the setting data stored in the setting file 35.

At a step ST2, the setting processing program 39b checks whether the date and time of the selected television program has arrived. If it has, the procedure goes to a step ST3. Otherwise, the procedure goes back to the step ST1 to repeat the above process.

At step ST3, the setting processing program 39b checks whether the identification code of the selected television program indicates a reception setting or a recording setting based on the setting data stored in the setting file 35. If the identification code shows a reception setting, the procedure goes to a step ST4. At the step ST4, the setting processing program 39b set the channel of the television set 36 to the requested channel of the setting data, so that the television set 36 starts receiving the broadcast of the selected television program. If it is found at the step ST3 that the identification code indicates a recording setting, the procedure goes to a step ST5.

At the step ST5, the setting processing program 39b sets the channel of the VTR 37 to the specified channel of the setting data.

At a step ST6, the setting processing program 39b controls the VTR 37 to start recording the selected television program.

At a step ST7, the setting processing program 39b checks whether the ending time specified in the setting data has arrived. If it has, the procedure goes to a step ST8. Otherwise, the procedure repeats the step ST7 so as to wait until the ending time comes.

At the step ST8, the setting processing program 39b stops the recording of the VTR 37. This ends the procedure.

In this manner, the setting processing program 39b controls a process of automatically receiving/recording television programs by using the setting data in the setting file 35 provided from the broadcast-program-information supplying program 300.

The procedure of FIG. 20 is based on an assumption that the personal computer 33 is not provided with an interface for turning on/off the television set 36, so that the personal computer 33 sets only the channel of the television set 36. If such an interface is provided, a similar control to that of the VTR 37 may be applied to the television set 36. That is, the television set 36 may be turned on to receive broadcast when a starting time comes, and may be turned off to stop reception of broadcast when the broadcast ends.

Although the present invention has been described with reference to a particular embodiment, the described embodiment is not intended to limit the scope of the present invention. For example, the above description is provided with regard to a particular case in which detailed information on a television program (detailed program guide) has the TV setting button 70 and the recorder setting button 71.

However, these buttons may be provided for a listing of television programs. Alternately, only either one of these buttons may be provided.

Further, although the above embodiment describes a configuration in which the personal computer 33, the television set 36, and the VTR 37 are provided as separate devices, these devices may be integrated in a single casing.

It is apparent that the present invention is not limited to transmission of listings of television programs, but can be applied to transmission of listings of radio programs without any configurational changes.

The above embodiment describes a configuration in which the Internet 32 is used for communication. The present invention is not limited to this configuration, but can be applied to cases in which communication is implemented via an analog network, a digital network, a telephone network, a radio-wave system, etc.

According to the present invention as described above, the broadcast-program transmission device allows a user to make settings for automatic receiving/recording of a broadcast program at an indicated future time through a simple button operation. In other words, settings for automatic receiving/recording of broadcast programs can be readily made.

Also, according to the present invention, the terminal device can control a receiver to receive broadcast programs and a recorder to record broadcast programs as specified by the broadcast-program transmission device.

Further, the present invention is not limited to these embodiments, but various variations and modifications may be made without departing from the scope of the present invention.

What is claimed is:

1. A device for sending detailed broadcast-program guide information that a user requested to a plurality of terminal devices connected via a network so that said plurality of terminal devices display said detailed broadcast-program guide information on display screens thereof, said device comprising:
    an initial-setting screen displaying a standard setting button and a modify-setting button, wherein the standard setting button issues an instruction to assign channel numbers and the modify setting button provides one of an instruction to assign non-standard channel numbers, a request to change customized categories, and a request to change a password;
    an addition unit to attach one of a reception setting button and a recording setting button to said detailed broadcast-program guide information sent to a terminal device, said reception setting button and said recording setting button each comprising an indicator indicative of a location in the network of said device for sending said detailed broadcast-program guide information, said reception setting button and said recording setting button being used in said terminal device to send a request to said location in the network for making settings for automatic receiving and recording, respectively, of a selected broadcast program scheduled for broadcast at a predetermined date and time;
    an execution-information extracting unit to obtain execution information in response to said request sent from said terminal device via the network, said execution information specifying information necessary for said terminal device to make said settings; and
    a transmission unit to send said execution information to said terminal device.

2. The device as claimed in claim 1, further comprising:
    a broadcast-program management unit storing information on broadcast programs;
    a shift-button addition unit to attach shift buttons to broadcast programs appearing on a listing of broadcast programs sent to said terminal device, said shift buttons being used in said terminal device to issue a request for program-guide information on a selected broadcast program by selecting a corresponding one of said shift buttons; and
    a program-guide extracting unit to extract said program-guide information on said selected broadcast program from said broadcast-program management unit in response to said request for program-guide information,
    wherein said addition unit attaches said one of said reception setting button and said recording setting button to said program-guide information.

3. The device as claimed in claim 2, further comprising a generation unit to extract information from said broadcast-program management unit with respect to broadcast programs corresponding to a date and a time indicated by said terminal device, and to edit the extracted information to generate said listing of broadcast programs.

4. The device as claimed in claim 1, wherein said network is an information service network.

5. The device as claimed in claim 1, wherein said execution information includes a channel number, a broadcast date, a starting time, and an ending time of said selected broadcast program.

6. A device for receiving detailed broadcast-program guide information that a user requested from a transmission device connected via a network and for displaying said detailed broadcast-program guide information on a display screen thereof, said device comprising:
    an initial-setting screen displaying a standard setting button and a modify-setting button, wherein the standard setting button issues an instruction to assign channel numbers and the modify setting button provides one of an instruction to assign non-standard channel numbers, a request to change customized categories, and a request to change a password;
    a display unit which displays a button comprising an indicator to indicate a location in the network of said transmission device for sending said detailed program guide information, said button being operated to send a request to said location so as to call upon said transmission device to send execution information;
    a receiving unit to receive execution information from said transmission device, said execution information specifying information necessary for making settings indicating a predetermined date and time and corresponding to automatic receiving and automatic recording of a selected broadcast program scheduled for broadcast at the predetermined date and time;
    a setting-file unit to store said execution information;
    a check unit to check if the date and the time specified in said execution information has arrived; and
    an instruction unit to give one of a first instruction to a receiver to receive said selected broadcast program, and a second instruction to a recorder to record said selected broadcast program based on said execution information, when the predetermined date and time has arrived.

7. The device as claimed in claim 6, wherein said instruction unit comprises a remote controller to control one of said receiver and said recorder.

8. The device as claimed in claim 6, wherein one of said receiver and said recorder is integrated with said device in a single casing.

9. The device as claimed in claim 6, wherein said network is an information service network.

10. The device as claimed in claim 6, wherein said execution information includes a channel number, a broadcast date, a starting time, and an ending time of said selected broadcast program.

11. A method of controlling automatic receiving and automatic recording of a selected broadcast program by using one of a receiver and a recorder, respectively, in a system comprising a server device which transmits one of detailed broadcast-program guide information that a user requested to a plurality of terminal devices via a network, so that said terminal devices display said detailed broadcast-program guide information on display screens thereof, said method comprising:

displaying a standard setting button and a modify-setting button, wherein the standard setting button issues an instruction to assign channel numbers and the modify setting button provides one of an instruction to assign non-standard channel numbers, a request to change customized categories, and a request to change a password;

attaching one of a reception setting button and a recording setting button to said detailed broadcast-program guide information in said server device, said reception setting button and said recording setting button each comprising an indicator to indicate a location of said server device in the network;

sending said detailed broadcast-program guide information from said server device to a terminal device;

issuing a request corresponding to one of said automatic receiving and said automatic recording of a selected broadcast program from said terminal device to said server device by using one of said reception setting button and said recording setting button, respectively, displayed by said terminal device, to send said request to said location in the network, the selected broadcast program being scheduled for broadcast at a predetermined date and time and the issued request indicating the corresponding one of automatic receiving and automatic recording to occur at the scheduled date and time;

obtaining execution information in said server device in response to said request from said terminal device, said execution information specifying information necessary for making settings corresponding to one of said automatic receiving and said automatic recording;

sending said execution information from said server device to said terminal device;

storing said execution information in a file in said terminal device;

checking in said terminal device if a date and a time specified in said execution information has arrived; and giving, by using said terminal device, one of a first instruction to said receiver to receive said selected broadcast program, and a second instruction to said recorder to record said selected broadcast program, based on said execution information when said date and time has arrived.

12. The method as claimed in claim 11, wherein said execution information includes a channel number, a broadcast date, a starting time, and an ending time of said selected broadcast program.

13. A device for sending detailed program guide information that a user requested to a terminal device connected via a network, comprising:

an initial-setting screen displaying a standard setting button and a modify-setting button, wherein the standard setting button issues an instruction to assign channel numbers and the modify setting button provides one of an instruction to assign non-standard channel numbers, a request to change customized categories, and a request to change a password;

a first sending unit to send the detailed program guide information to the terminal via the network, the detailed program guide information having a recording setting button attached thereto for recording a broadcast program scheduled for broadcast at a predetermined date and time;

an extracting unit to extract execution information to record the broadcast program in response to a request issued from the terminal device when the recording setting button is operated, said execution information specifying information necessary for said terminal device to make settings corresponding to the operation of the recording setting button and indicating instructions for recording the broadcast program at the scheduled date and time; and a second sending unit to send the execution information to record the broadcast program to the terminal device via the network.

14. The device of claim 13, wherein said first sending unit sends the detailed program guide information in such a form as customized by a user of the terminal device.

15. The device of claim 14, wherein the customized program information has a customized order of channel appearances when displayed at the terminal device.

16. The device of claim 14, wherein the customized program information has a customized selection of channels when displayed at the terminal device.

17. The device of claim 14, wherein the customized program information has a customized selection of categories when displayed at the terminal devices.

18. The device of claim 14, wherein the customized program information has a customized selection of time slots when displayed at the terminal devices.

19. The device of claim 14, wherein settings of customized program information are protected by user password.

20. The device of claim 13, wherein the detailed program guide information has a table format in which channels are shown in a first grid and time-slots are shown in a second grid.

21. The device of claim 13, wherein the execution information includes at least a date, a starting time, and a channel of the program to be recorded.

22. A device for sending detailed program guide information that a user requested to a terminal device connected via a network, comprising:

an initial-setting screen displaying a standard setting button and a modify-setting button, wherein the standard setting button issues an instruction to assign channel numbers and the modify setting button provides one of an instruction to assign non-standard channel numbers, a request to change customized categories, and a request to change a password;

a first sending unit to send the detailed program guide information to the terminal device via the network, the detailed program guide information having a TV setting button attached thereto for reception of a broadcast program scheduled for broadcast at a predetermined date and time;

an extracting unit to extract execution information specifying information necessary for said terminal device to make settings corresponding to reception of the broadcast program at the scheduled date and time in response to a request issued from the terminal device when the TV setting button is operated; and a second sending unit to send the execution information for reception of the broadcast program to the terminal device via the network.

23. The device of claim 22, wherein said first sending unit sends the detailed program guide information in such a form as customized by a user of the terminal device.

24. The device of claim 23, wherein the customized program information has a customized order of channel appearances when displayed at the terminal devices.

25. The device of claim 23, wherein the customized program information has a customized selection of channels when displayed at the terminal device.

26. The device of claim 23, wherein the customized program information has a customized selection of categories when displayed at the terminal devices.

27. The device of claim 23, wherein the customized program information has a customized selection of time slots when displayed at the terminal devices.

28. The device of claim 23, wherein settings of customized program information are protected by user password.

29. The device of claim 23, wherein the program information has a table format in which channels are shown in a first grid and time-slots are shown in a second grid.

30. The device of claim 22, wherein the execution information includes at least a date, a starting time, and a channel of the program to be received.

31. A device for sending detailed program guide information that a user requested to a terminal device connected in a network, comprising:

an initial-setting screen displaying a standard setting button and a modify-setting button, wherein the standard setting button issues an instruction to assign channel numbers and the modify setting button provides one of an instruction to assign non-standard channel numbers, a request to change customized categories, and a request to change a password;

a first sending unit to send the detailed program guide information to the terminal device via the network, the detailed program guide information having a recording setting button attached thereto to record a broadcast program scheduled for broadcast at a predetermined date and time;

an extracting unit to extract execution information to record the broadcast program at the scheduled date and time in response to a request issued from the terminal device when the recording setting button is operated; and a second sending unit to send the execution information to record the broadcast program to the terminal device via the network, wherein the recording setting button includes an assigned URL to identify a location of the device for sending the detailed program guide information in the network.

32. A device for sending detailed program guide information that a user requested to a terminal device connected in a network, comprising:

an initial-setting screen displaying a standard setting button and a modify-setting button, wherein the standard setting button issues an instruction to assign channel numbers and the modify setting button provides one of an instruction to assign non-standard channel numbers, a request to change customized categories, and a request to change a password;

a first sending unit to send the detailed program guide information to the terminal device, the detailed program guide information having a TV setting button attached thereto for reception of a program;

an extracting unit to extract execution information for reception of a program in response to a request issued from the terminal device when the TV setting button is operated; and a second sending unit to send the execution information for reception of the program to the terminal device via the network, wherein the TV setting button includes an assigned URL to identify a location of the device for sending the detailed program guide information in the network.

33. A device for sending detailed broadcast-program guide information that a user requested to a terminal device over a network, said device comprising:

an initial-setting screen displaying a standard setting button and a modify-setting button, wherein the standard setting button issues an instruction to assign channel numbers and the modify setting button provides one of an instruction to assign non-standard channel numbers, a request to change customized categories, and a request to change a password;

an addition unit to attach a setting button to the detailed broadcast-program guide information to be sent to a terminal device and indicating a specific broadcast program scheduled for broadcast at a predetermined date and time; and a transmission unit to send execution information to the terminal device responsive to operation of the setting button at the terminal device, the execution information comprising an instruction for one of setting a receiver to receive and setting a recorder to record the specific broadcast program at the predetermined date and time.

34. A method for sending detailed broadcast-program guide information that a user requested to a terminal device over a network, the method comprising:

displaying a standard setting button and a modify-setting button, wherein the standard setting button issues an instruction to assign channel numbers and the modify setting button provides one of an instruction to assign non-standard channel numbers, a request to change customized categories, and a request to change a password;

attaching a setting button to the detailed broadcast-program guide information to be sent to a terminal device and indicating a specific broadcast program scheduled for broadcast at a predetermined date and time; and sending execution information to the terminal device responsive to operation of the setting button at the terminal device, the execution information comprising an instruction for one of setting a receiver to receive and setting a recorder to record the specific broadcast program at the predetermined date and time.

* * * * *

UNITED STATES PATENT AND TRADEMARK OFFICE
CERTIFICATE OF CORRECTION

PATENT NO. : 6,732,372 B2
DATED : May 4, 2004
INVENTOR(S) : Yasumasa Tomita et al.

It is certified that error appears in the above-identified patent and that said Letters Patent is hereby corrected as shown below:

Column 21,
Line 23, change "claim 23" to -- claim 22 --; and
Line 23, change "program" to -- detailed program guide --.

Signed and Sealed this

Eighteenth Day of January, 2005

JON W. DUDAS
*Director of the United States Patent and Trademark Office*